US012423336B1

(12) United States Patent
Vogel et al.

(10) Patent No.: US 12,423,336 B1
(45) Date of Patent: Sep. 23, 2025

(54) DISCOVERY LOOP SYSTEM AND METHOD WITH PLOTS

(71) Applicant: Intelligent Search Technology, Inc., Carson City, NV (US)

(72) Inventors: Claude Vogel, Carson City, NV (US); James Haymaker, Carson City, NV (US)

(73) Assignee: Intelligent Search Technology, Inc., Carson City, NV (US)

( * ) Notice: Subject to any disclaimer, the term of this patent is extended or adjusted under 35 U.S.C. 154(b) by 0 days.

(21) Appl. No.: 18/508,068

(22) Filed: Nov. 13, 2023

Related U.S. Application Data

(60) Provisional application No. 63/425,432, filed on Nov. 15, 2022.

(51) Int. Cl.
*G06F 16/332* (2025.01)
*G06F 16/9535* (2019.01)
*G06F 40/284* (2020.01)

(52) U.S. Cl.
CPC ...... *G06F 16/3325* (2019.01); *G06F 16/9535* (2019.01); *G06F 40/284* (2020.01)

(58) Field of Classification Search
CPC . G06F 16/3325; G06F 16/9535; G06F 40/284
See application file for complete search history.

(56) References Cited

U.S. PATENT DOCUMENTS

| 6,771,875 | B1* | 8/2004 | Kunieda | G06F 16/7343 |
| | | | | 386/234 |
| 2014/0324864 | A1* | 10/2014 | Choe | G06F 16/73 |
| | | | | 707/737 |
| 2015/0169758 | A1* | 6/2015 | Assom | G06F 16/36 |
| | | | | 707/603 |
| 2017/0277676 | A1* | 9/2017 | Vogel | G06F 40/211 |
| 2017/0277779 | A1* | 9/2017 | Vogel | G06F 40/295 |
| 2017/0277782 | A1* | 9/2017 | Vogel | G06F 40/284 |
| 2017/0277996 | A1* | 9/2017 | Vogel | G06F 40/30 |

OTHER PUBLICATIONS

M. Naik, V. Jain and R. S. Aygun, "S3G: A Semantic Sequence State Graph for Indexing Spatio-temporal Data—A Tennis Video Database Application," 2008 IEEE International Conference on Semantic Computing, Santa Monica, CA, USA, 2008, pp. 66-73, doi: 10.1109/ICSC.2008.77. (Year: 2008).*

Jeongkyu Lee, M. Emre Celebi, "STRG-QL: spatio-temporal region graph query language for video databases," Proc. SPIE 6820, Multimedia Content Access: Algorithms and Systems II, 68200P (Jan. 28, 2008); https://doi.org/10.1117/12.765531 (Year: 2008).*

(Continued)

*Primary Examiner* — William P Bartlett
(74) *Attorney, Agent, or Firm* — Manatt, Phelps & Phillips, LLP

(57) ABSTRACT

A discovery loop system and method may form a seamless loop from content to search results displayed as documents or maps then from selected documents or node(s) in map to documents or maps through a discovery and selection processes. The discovery loop system and method may use plots as part of the discovery loop. A method and system that processes content into a causal chain of situations, known as plots, may be performed.

10 Claims, 32 Drawing Sheets

(56) References Cited

OTHER PUBLICATIONS

JeongKyu Lee, JungHwan Oh, and Sae Hwang. 2005. STRG-Index: spatio-temporal region graph indexing for large video databases. In Proceedings of the 2005 ACM SIGMOD international conference on Management of data (SIGMOD '05). Association for Computing Machinery, New York, NY, USA, 718-729. (Year: 2005).*

J. Lee, "A Graph-Based Approach for Modeling and Indexing Video Data," Eighth IEEE International Symposium on Multimedia (ISM'06), San Diego, CA, USA, 2006, pp. 348-355, doi: 10.1109/ISM.2006.4. (Year: 2006).*

* cited by examiner

```
Mayor Trevor Elkins agreed to step down.

,Mayor,/,PROPN,/,NNP,/,compound,/,compound,^^^,Elkins,/,PROPN,/,NNP,/,nsubj
,Trevor,/,PROPN,/,NNP,/,compound,/,compound,^^^,Elkins,/,PROPN,/,NNP,/,nsubj
,Elkins,/,PROPN,/,NNP,/,nsubj,/,nominal subject,^^^,agreed,/,VERB,/,VBD,/,RO
OT,<<<,Mayor,Trevor
,agreed,/,VERB,/,VBD,/,ROOT,/,ROOT,^^^,agreed,/,VERB,/,VBD,/,ROOT,<<<,Elkins
,>>>,step,.
,to,/,PART,/,TO,/,aux,/,auxiliary,^^^,step,/,VERB,/,VB,/,xcomp
,step,/,VERB,/,VB,/,xcomp,/,open clausal complement,^^^,agreed,/,VERB,/,VBD,
/,ROOT,<<<,to,>>>,down
,down,/,ADP,/,RP,/,prt,/,particle,^^^,step,/,VERB,/,VB,/,xcomp
,.,/,PUNCT,/,.,/,punct,/,punctuation,^^^,agreed,/,VERB,/,VBD,/,ROOT
 agreed / ROOT , root
      Elkins / nsubj , nominal subject
      step / xcomp , open clausal complement
            down / prt , particle
```

FIGURE 2B

```
'semio': {
        'NC': 'agreement',
        'NF': 'ACCEPT',
        'action': 'agree',
        'entail': {
                'obligation': 'COMPLY',
                'resolution': ''
        },
        'polarity': 'assertive',
        'source': 'levin',
        'trans': 'btrans'
},
```

FIGURE 2D

```
{'cast_on_stage': [{'featx': {'elabel': 'PERSON'},
                    'name': 'Mayor Trevor Elkins',
                    'occ': [{'p': 0, 's': 0, 'span': [0, 19]}]}],
 'cc': {'main:MayorTrevorElkinsAgree': {'CD': {'action': 'agree',
                                                'agent': 'Mayor Trevor Elkins',
                                                'object': None,
                                                'recipient': None,
                                                'trans': 'btrans'},
                                         'TAM': {'aspect': 'done',
                                                 'mode': 'assertion',
                                                 'polarity': 'affirmation',
                                                 's': 'agree',
                                                 'tense': 'past',
                                                 'type': 'action',
                                                 'voice': 'active'},
                                         'advcl': [],
                                         'and': [],
                                         'ccomp': [],
                                         'entailment': [{'obligation': '',
                                                         'resolution': ''}],
                                         'pcomp': [],
                                         'pp': [],
                                         'rel': [],
                                         'semio': {'NC': 'agreement',
                                                   'NF': 'ACCEPT',
                                                   'action': 'agree',
                                                   'entail': {'obligation': 'COMPLY',
                                                              'resolution': ''},
                                                   'polarity': 'assertive',
                                                   'source': 'levin',
                                                   'trans': 'btrans'},
                                         'tag': 'MayorTrevorElkinsAgree',
                                         'xcomp': 'xcomp:MayorTrevorElkinsStep_Down'},
```

FIGURE 2E1

```
'xcomp:MayorTrevorElkinsStep_Down': {'CD': {'action': 'step_down',
                                            'agent': 'MayorTrevorElkins',
                                            'object': None,
                                            'recipient': None,
                                            'trans': 'xtrans'},
                                     'TAM': {'aspect': 'do',
                                             'mode': 'assertion',
                                             'polarity': 'affirmation',
                                             's': 'step_down',
                                             'tense': 'now',
                                             'type': 'action',
                                             'voice': 'active'},
                                     'advcl': [],
                                     'and': [],
                                     'ccomp': [],
                                     'entailment': [{'obligation': '',
                                                     'resolution': ''}],
                                     'pcomp': [],
                                     'pp': [],
                                     'rel': [],
                                     'semio': {'NC': 'withdraw',
                                               'NF': 'STEP_DOWN',
                                               'action': 'step_down',
                                               'entail': {'obligation': '',
                                                          'resolution': ''},
                                               'polarity': 'passive',
                                               'source': 'trans',
                                               'trans': 'xtrans'},
                                     'tag': 'MayorTrevorElkinsStep_Down',
                                     'xcomp': []}},
```

FIGURE 2E2

```
{
  "_id" : ObjectId("xxxxxxxxxxxxxxxxxxxxx"),
  "user_id" : "auth0|xxxxxxxxxxxxxxxxxxx",
  "labs" : [
    {
      "name" : "trump",
      "owner" : "auth0|xxxxxxxxxxxxxxxxxxx",
      "status" : "private",
      "bulk" : [
        {
          "user_id" : "auth0|xxxxxxxxxxxxxxxxxxx",
          "user_name" : "gggggggggggg",
          "doc_id" : "ennwddddddddddddddddddddddddd",
          "title" : "Trump looms large as voters in five states choose candidates for Congress, governor",
          "summary" : "Former U.S. President Donald Trump delivers remarks at the America First Policy Institute America First Agenda Summit in Washington, U.S., July 26, 2022. \n\nTrump-backed nominees have won Republican primaries for U.S. Senate in Pennsylvania, Georgia, North Carolina and Ohio, though his picks lost nominating contests for Georgia governor and for U.S. House in South Carolina. \n\n\"Trump remains really popular with Republican primary voters. \n\nLake, a former news anchor, echoes Trump false claims that his 2020 election defeat was the result of fraud and has said she would not have certified Biden's statewide victory in 2020.",
```

FIGURE 3B1

```
"url" : "https://www.reuters.com/world/us/trump-looms-large-voters-five-states-choose-candidates-congress-governor-2022-08-02/",
          "imageUrl" : "https://www.reuters.com/resizer/fhl_q-
NU5X19ERyEIhNclHe2S_A=/1200x628/smart/filters:quality(80)/cloudfront-us-east-
2.images.arcpublishing.com/reuters/JOUPHBSBZFKVZIRM4XDMRNU4HY.jpg",
          "type" : null,
          "ratings" : {
            "up" : NumberInt(0),
            "down" : NumberInt(0)
          },
          "comments" : [

]
        }
      ],
      "wall" : [
        {
          "user_id" : "auth0|xxxxxxxxxxxxxxxxxxx",
          "user_name" : "ggggggggggg",
          "map_id" : "mmmmmmmmmmmmmmmmmmmmmmmmmmm",
          "title" : "President Donald J. Trump",
          "ratings" : {
            "up" : NumberInt(0),
            "down" : NumberInt(0)
          },
          "comments" : [

```
Trevor Elkins accused of frauds.
,Trevor,/,PROPN,/,NNP,/,compound,/,compound,^^^,Elkins,/,PROPN,/,NNP,/,nsubj
,Elkins,/,PROPN,/,NNP,/,nsubj,/,nominal
subject,^^^,accused,/,VERB,/,VBN,/,ROOT,<<<,Trevor
,accused,/,VERB,/,VBN,/,ROOT,/,ROOT,^^^,accused,/,VERB,/,VBN,/,ROOT,<<<,Elkins,>>>,of,.
,of,/,ADP,/,IN,/,prep,/,prepositional modifier,^^^,accused,/,VERB,/,VBN,/,ROOT,>>>,frauds
,frauds,/,NOUN,/,NNS,/,pobj,/,object of preposition,^^^,of,/,ADP,/,IN,/,prep
,.,/,PUNCT,/,.,/,punct,/,punctuation,^^^,accused,/,VERB,/,VBN,/,ROOT
 accused / ROOT , root
        Elkins / nsubj , nominal subject
        of / prep , prepositional modifier
                frauds / pobj , object of preposition
```

FIGURE 15A

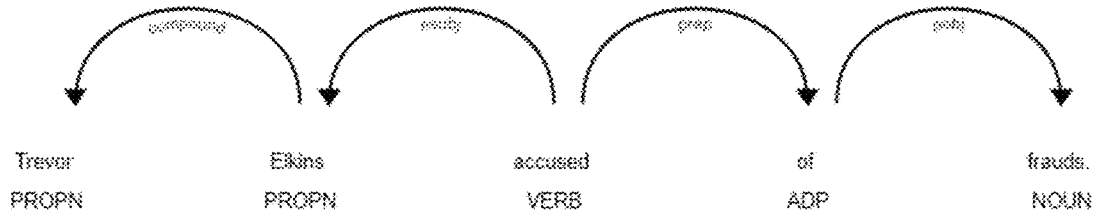

FIGURE 15B

```
{'cast_on_stage': [{'featx': {'elabel': 'PERSON'},
                    'name': 'Trevor Elkins',
                    'occ': [{'p': 0, 's': 0, 'span': [0, 13]}]}],
 'cc': {'main:TrevorElkinsAccuse': {'CD': {'action': 'accuse',
                                           'agent': 'Trevor Elkins',
                                           'object': None,
                                           'recipient': None,
                                           'trans': 'utrans'},
                                    'TAM': {'aspect': 'done',
                                            'mode': 'assertion',
                                            'polarity': 'affirmation',
                                            's': 'accuse',
                                            'tense': 'past',
                                            'type': 'action',
                                            'voice': 'active'},
                                    'advcl': [],
                                    'and': [],
                                    'ccomp': [],
                                    'entailment': [{'obligation': 'suspect',
                                                    'resolution': 'expose'}],
                                    'pcomp': [],
                                    'pp': 'of:frauds',
                                    'rel': [],
                                    'semio': {'NC': 'trust',
                                              'NF': 'SUSPECT',
                                              'action': 'accuse',
                                              'entail': {'obligation': 'suspect',
                                                         'resolution': 'expose'},
                                              'polarity': 'adverse',
                                              'source': 'events',
                                              'trans': 'utrans'},
                                    'tag': 'TrevorElkinsAccuse',
                                    'xcomp': []}},
```

FIGURE 16

```
results = db['semio_index'].aggregate([
  {
    "$search": {
      "compound": {
        "must": [
            {
                "phrase": {
                    "query": "Trevor Elkins",
                    "path": ["title", "summary"]
                }
            },
        ],
        "should": [
            {
                "phrase": {
                    "query": ["fraud"],
                    "path": "title"
                }
            },
            {
                "text": {
                    "query": ["accused"],
                    "path": ["title", "summary"]
                }
            }
        ]
      }
    }
  },
  {
    "$limit": 5
  },
  {
    "$project": {
      "title": 1,
      "score": { "$meta": "searchScore" }
```

FIGURE 17

1 Newburgh Heights Mayor Trevor Elkins pleads not guilty to charges of attempted fraud, theft 21.04

2 3News Investigates: Newburgh Heights Mayor Trevor Elkins charged with attempted fraud 17.86

3 Former Newburgh Heights Mayor Trevor Elkins to be sentenced in attempted fraud case 17.21

4 Watch live: Newburgh Heights Mayor Trevor Elkins to change his plea in attempted fraud case 16.86

FIGURE 18

```
{'cast_on_stage': [{
                    'name': 'Mayor Trevor Elkins',
                    'isa': 'official'
           }],
  'cc': [{'main:MayorTrevorElkinsPleadNotGuilty': {'CD': {'action': 'plead not guilty',
                                                  'agent': 'Mayor Trevor Elkins',
                                                  'object': None,
                                                  'recipient': None,
                                                  'adjectival complement': 'guilty',
                                                  'negation modifier': True,
                                                  'trans': 'atrans'},
                                           'TAM': {'aspect': 'do',
                                                   'mode': 'assertion',
                                                   'polarity': 'negative',
                                                   's': 'plead',
                                                   'tense': 'now',
                                                   'type': 'action',
                                                   'voice': 'active'},
                                           'advcl': [],
                                           'and': [],
                                           'ccomp': [],
                                           'entailment': [{'obligation': '',
                                                           'resolution': ''}],
                                           'pcomp': [],
                                           'pp': 'to:ChargeOfFraud',
                                           'rel': [],
                                           'semio': {'NC': 'claim',
                                                     'NF': 'PLEAD_NOT_GUILTY',
                                                     'action': 'plead',
                                                     'entail': {'obligation': '',
                                                                'resolution': ''},
                                                     'polarity': 'assertive',
                                                     'source': 'trans',
                                                     'trans': 'atrans'},
                                           'tag': 'MayorTrevorElkinsPleadNotGuilty',
                                           'xcomp': []}
```

FIGURE 19

Newburgh Heights Mayor Trevor Elkins pleads not guilty to charges of attempted fraud, theft 14.729284286499023

Man pleads not guilty to dragging El Cajon officer with SUV 11.189675331115723
Peñitas mayor pleads not guilty to federal theft charges, bond set at $50000 10.25596809387207

Former Oakbrook Terrace mayor pleads not guilty to fraud charges in wide-ranging red-light camera bribery case 10.153129577636719

Mayor Lovely Warren pleads not guilty to firearms, child endangerment charges 9.678350448608398

Rochester Mayor Lovely Warren's husband pleads not guilty to drug, weapons charges 9.132988929748535

Top Trump Finance Officer Pleads Not Guilty to Manhattan Tax Charges 8.95344066619873

Former MU College of Engineering fiscal officer pleads not guilty to stealing, fraud 8.932254791259766

FIGURE 20

```
'cast_on_stage': ['official', 'whistleblower', 'court', 'prosecutor'],
'CC': [
        {
                'agent': 'official',
                'NF'; 'DECEIT'
        },
        {
                'agent': 'whistleblower',
                'NF'; 'EXPOSE',
                'object': 'official'
        },
        {
                'agent': 'prosecutor',
                'NF'; 'ACCUSE',
                'object': 'official'
        },
        {
                'agent': 'official',
                'NF': 'PLEAD_NOT_GUILTY'
        },
        {
                'agent': 'official',
                'NF': 'PLEAD_GUILTY'
        },
        {
                'agent': 'official',
                'NF': 'PLEA_DEAL'
        },
        {
                'agent': 'official',
                'NF': 'STEP_DOWN'
        }
]
```

FIGURE 21

2 3News Investigates: Newburgh Heights Mayor Trevor Elkins charged with attempted fraud 17.86

1 Newburgh Heights Mayor Trevor Elkins pleads not guilty to charges of attempted fraud, theft 21.04

3 Former Newburgh Heights Mayor Trevor Elkins to be sentenced in attempted fraud case 17.21

4 Watch live: Newburgh Heights Mayor Trevor Elkins to change his plea in attempted fraud case 16.86

FIGURE 22

```
results = db['semio_index'].aggregate([
  {
    "$search": {
      "compound": {
        "must": [
            {
                "phrase": {
                    "query": ["Trevor Elkins"],
                    "path":  ["title", "summary"]
                }
            },
        ],
        "should": [
            {
                "text": {
                    "query": ["accusation", "investigation", "allegation"],
                    "path": ["summary"]
                }
            }
        ]
      }
    }
  }])
```

FIGURE 23

- Causal antecedent
    "Why did the Protagonist  NF  ?"
- Goal orientation
    "for what purpose did the Protagonist  NF ?"
- Enablement
    "How was the Protagonist  able to NF ?"
- Causal consequent
    "What happened when the Protagonist  NF ?"
- Verification
    "Did the Protagonist  NF ?"
- Disjunctive
    "Was it the Protagonist  who NF ?"
- Instrumental/procedural
    "How did the Protagonist  NF  ?"
- Concept completion
    "What did the Protagonist  say ?"
- Expectational
    "Why isn't the Protagonist  NF ?"
- Judgmental
    "What should the Protagonist  NF ?"
- Quantification
    "What allies does the Protagonist  have ?"
    "What enemies does the Protagonist  have ?"
- Feature specification
    "What is the Protagonist 's activity ?"
- Request
    "What should the Protagonist  do ?"

FIGURE 24

DISCOVERY LOOP SYSTEM AND METHOD WITH PLOTS

APPENDIX

This application claims priority under 35 USC 119 (e) to U.S. Provisional Patent Application Ser. No. 63/425,432 filed Nov. 15, 2022 and entitled "Discovery Loop System and Method with Plots", the entirety of which is incorporated herein by reference.

APPENDIX

Appendix A (12 pages) contains two examples of the operation of the system. Appendix A forms part of the specification.

FIELD

The disclosure relates to a search system that loops content back through the search process and produces results from the discovery loop that are presented to the user like normal search results.

BACKGROUND

Traditionally, search engines provide consumer search, and text mining is used within research projects. Text mining is not offered as a consumer-oriented service to discover patterns of connections between entities. Text mining typically uses natural language processing technologies which are not the fundamental components of search indexing. Until recently, the primary technology behind Google or Bing was a document-to-document assessment of centrality, whereas the primary technology behind text mining is an entity-to-entity assessment of the strength of their association. The natural output of search is a list of "pages" ranked. The natural output of text mining is a visual display (a "map") of concept clusters.

A map is not a search tool, it's a discovery tool: a rendering of the connections and paths that one can use to visualize patterns and explore the relationships between a set of concepts. A search engine is not a text mining tool: the results show the documents but not directly the concepts. However, it would be desirable to be able to fuse the search tool and discovery tool together since the results generated by these technologies are correlated. For example, if a document is central to a search domain, the concepts found in the text it contains are likely equally central to the domain considered.

The technical problem with fusing the search tool and the discovery tool is that each has different inputs and requirements that would be confusing to an average consumer who is used to known search engines and their interfaces. It is thus desirable to provide a novel discovery loop system that fuses the search tool and discovery tool such that the underlying differences between the search tool and the discovery tool is not exposed to the consumer and it is to this end that the disclosure is directed.

BRIEF DESCRIPTION OF THE DRAWINGS

FIG. 2B illustrates an example of a piece of text from which one or more syntactical dependencies may be generated;
FIG. 2D illustrates an example of the conceptual dependency generated by the indexing method;
FIGS. 2E1 and 2E2 show an example of agree event generated from the text in FIG. 2B;
FIGS. 3B1 and 3B2 illustrate an example of the labs evidence shown in FIG. 3A;
FIGS. 15A and 15B illustrate the conceptual dependencies for the Mayor Elkins example;
FIG. 16 illustrates an episode generated by the system for the Mayor Elkins example;
FIG. 17 illustrates a search pipeline generated by the system for the Mayor Elkins example;
FIG. 18 illustrates an example of episode titles and scores generated by the system for the Mayor Elkins example;
FIG. 19 is an example of the first episode generated by the system for the Mayor Elkins example;
FIG. 20 is an example of a not guilty plea used by the system for the Mayor Elkins example;
FIG. 21 is an example of a corrupt official resign plot template used by the system for the Mayor Elkins example;
FIG. 22 shows the episodes from FIG. 18 reordered;
FIG. 23 shows examples of lexical variations used by the system for the Mayor Elkins example;
and
FIG. 24 is an example of query templates used by the system for the Mayor Elkins example.

DETAILED DESCRIPTION OF ONE OR MORE EMBODIMENTS

Figure 1:
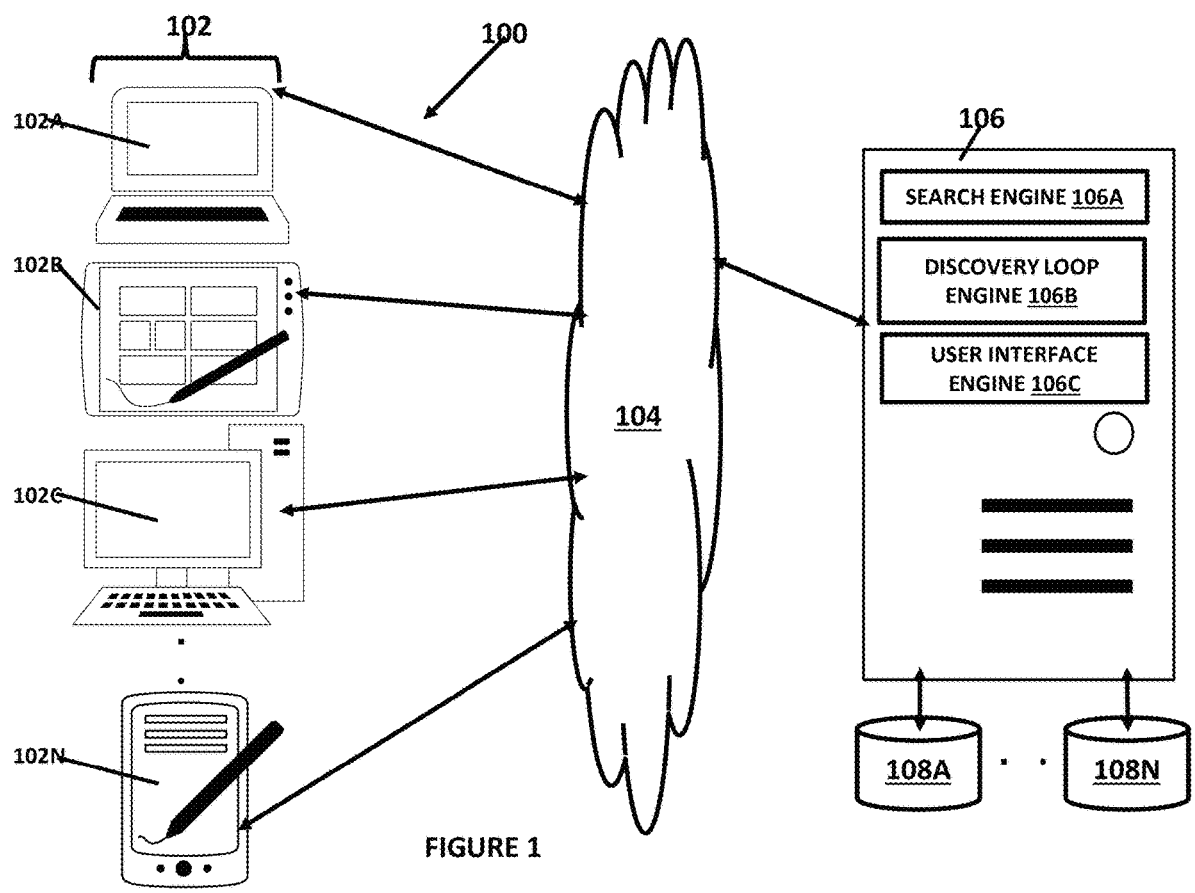
FIG. 1 is a block diagram of an implementation of a search system that has a discovery loop engine with plots.

The disclosure is particularly applicable to a cloud based news feed search engine with the discovery loops with plots and it is in this context that the disclosure will be described. It will be appreciated, however, that the system and method has greater utility for several reasons. First, the system or method may be implemented as a standalone computer system, as an application executed one a computing device, using known client/server components, as a software as a service to a third party and the like. Second, the system and method can be used with various different types of content, such as search results, video search results, etc. in addition to news feeds.

The system and method disclosed below permits a user to loop through a feed of daily news and thus let users unearth very powerful insights while having fun using visually enticing tools. In one embodiment, the system is implemented as a mobile discovery app, but it could also be a licensable platform. The user experience is based on a loop: the first step is the user browsing the feed or searching and/or selecting news in the feed or the search results and to "map" that content. Then, from the map, the user can select nodes and ask to map them again or to see the quotes behind them. Then, the user can select and ask for more docs or another map from these quotes. As a result, the user experience is an endless discovery of intriguing connections worth exploring in detail, possibly by changing the perspective, from docs to maps and back. The system and method may also include "plots" which are visual rendition of events and protagonists. The plots will again be part of the same user experience discovery loop in which the user can check a doc or a map, select and ask for the plot, browse the timeline of events and select one specific event, then request docs, maps, or more specific plots. The system and method may perform the discovery loop and then return results just like the typical search results so that the user may be unaware of the discovery loop. The system and method provides a technical solution to the above limitations and issues with current search engines since the processes to perform the discovery loop cannot be performed in the human mind due in part to the overwhelming amount of data/content and the complicated processes being performed.

The discovery loop system and method fuses the search technology and discovery technology in which the map for the discovery process is built dynamically from the search results returned by the search engine. The user can browse the map, explore the communities of concepts, identify the "brokers" in-between communities, and eventually select the most intriguing nodes to either re-map or to access the underlying documents. One novel technical solution achieved by the system is the obfuscation of the different details of each process so that, when the user selects nodes and requests a re-mapping, the system triggers a search for the best documents illustrating these nodes/concepts. These documents are dynamically mined for connections and patterns, and the resulting map is displayed. From the user's perspective, everything looks like a "deeper" map of the connections behind the selected node. The search was instrumental in the document collection, and the mapping technology was instrumental in the concept connection. Thus, the two technologies of search and text mining work in concert behind the discovery loop to provide a unique user experience.

FIG. 1 is a block diagram of a search system 100 that has a discovery loop engine that loops between content, such as documents of lexical maps, and the search results and uses plots using technical solutions that achieve the benefits for users set forth above. Like other known search engines, a user may use a computing device 102 to connect to, communicate with and access a search system 106 over a communications path 104 in order to perform a keyword search or browse certain categories of searches. Thus, the user connects to and communicates with the search system 106 (to convey the keywords or category or perform the discovery loop processes) and the search system 106 performs the search and discovery loop processes and/or returns search results that are returned to the user in a user interface. The search engine 106 further implements the discovery loop and discovery loop with plots.

The system 100 may have a plurality of computing devices 102A, 102B, 102C . . . , 102N that can each independently access the search system 106 over the communications path 104. Each computing device may have a hardware processor, memory, wireless or wired connectivity circuits to connect to the search system 106 and a display wherein the memory stores a known browser application, such as Google® Chrome®, etc., that is a plurality of lines of instructions executed by the hardware processor that allows the user to interact with the search system 106 and execute the discovery loop processes. In one embodiment, each computing device may also store in memory, download and store in memory or implement in a progressive web application (PWA), a mobile discovery app that has a plurality of lines of instructions executed by the hardware processor (examples of the user interface of which is shown in the figures) that cause the hardware processor to be configured to interact with the search system 106 including performing the discovery loop processes detailed below.

The search system 106 may send back information, such as HTML pages, et. with the search results and/or discovery loop process results that are converted into a user interface by the browser or mobile discovery app and displayed on the display of the computing device (examples of the user interface are shown in the figures and described below.) As shown in FIG. 1, each computing device 102 may be a laptop computer 102A. a tablet computer 102B, a personal computer 102D, a smartphone device 102N or any other device that is capable of connecting to and communicating with the search system 106. The communications path 104 may a wireless and/or wired path that may be secure or unsecure.

The search system 106 may be implemented by one or more computing resources, such as server computers, blade servers, cloud computing resources, etc. that have at least one processor and memory that store and execute a plurality of lines of instructions/computer code to perform the search and discovery loop operations/processes of the search system 106. In one embodiment, the search system 106 is implemented using cloud computing resources that control/interact and exchange data with the mobile discovery app on each computing device 102. The search system may further have a search engine 106A, a discovery loop engine 106B and a user interface engine 106C, each of which may be a plurality of lines of instructions/computer code executed by the processor of the computer system that implements the search system 106. The search engine 106A may perform the typical search engine operations to parse a keyword query, perform the search and return the one or more pieces of content that form the search results in a well-known manner. The discovery loop engine 106B may perform and coordinate with the mobile discovery app on each computing device to implement the discovery loop processes shown in FIG. 2 including the discovery loop processes with plots. The user interface engine 106C collects the search results and/or the result from the discovery loop processes and sends those back to each computing device in response to the request from each computing device. The search system 106 may have one or more hardware or software storage 108A, . . . , 108N that store the data used for the searches including the software for the various engines, user data, data used to perform the discovery loop processes with or without plots.

Figure 2A:
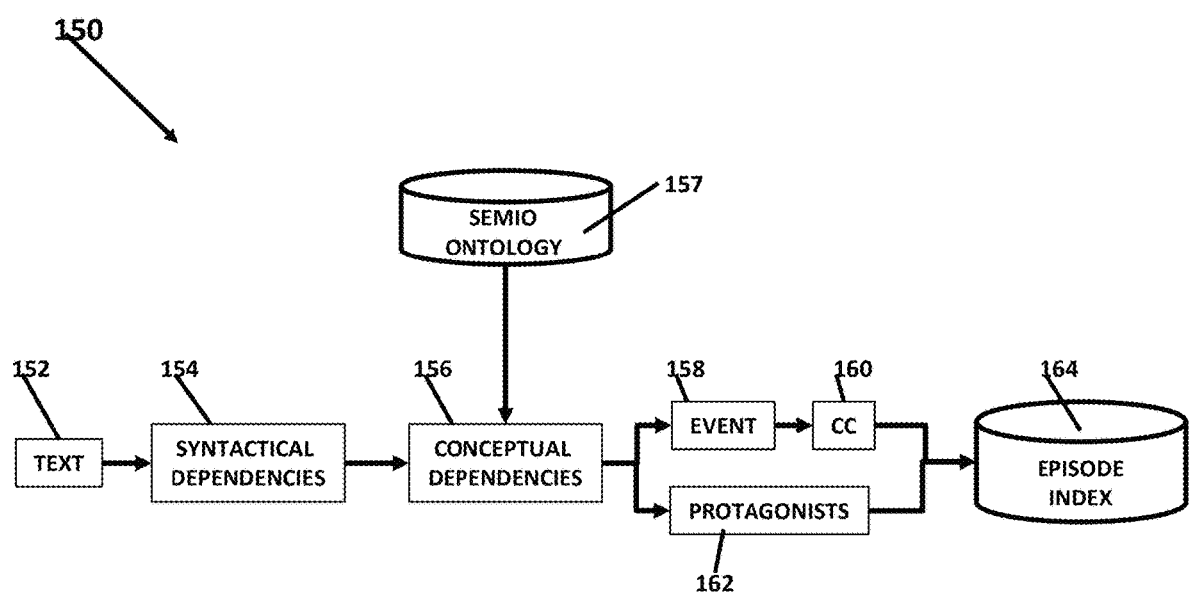
FIG. 2A illustrates an indexing process of the system.

FIG. 2A illustrates an indexing process 150 of the system in FIG. 1. In one embodiment, the indexing process 150 may be performed by the discovery loop engine 106B but may also be performed using other computer systems or even a computer system that is separate from the system in FIG. 1 or a third party system. In one embodiment, the indexing process may be implemented by a processor of the computer system executing a plurality of instructions that cause the processor to perform the operations/processes of the indexing process. The indexing process may be used, for example, to generate the plots used by the system as discussed in more detail below.

Figure 2C:
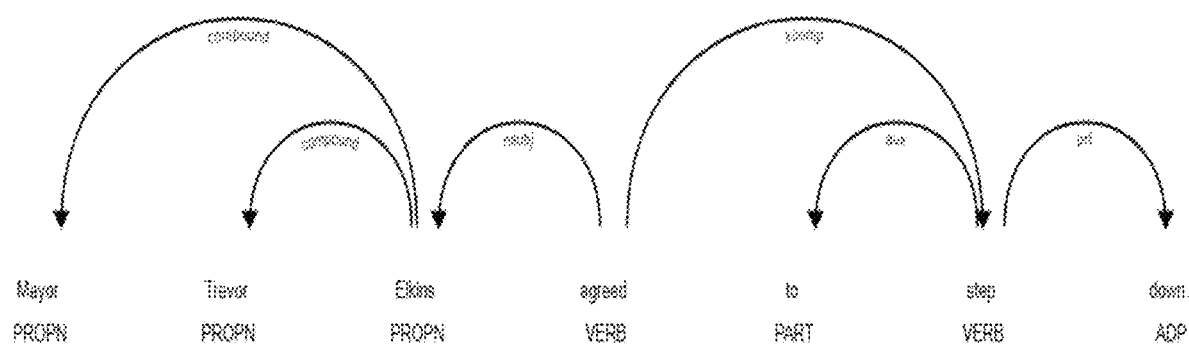
FIG. 2C illustrates an example of a generated syntactical dependency.

The indexing process may start with a piece of text 152 and any piece of text is a "story" if it narrates part or the whole of at least one Event. Six words can be enough to tell a story, as Hemingway demonstrated in a classic example: "For sale: Baby shoes, never worn." An example piece of text is shown in FIG. 2B. The text 152 may be used to generate one or more syntactical dependencies 154. Thus, for each sentence in the story, the method analyzes dependencies (using a commercially available program Spacy) and the method interprets them as Conceptual Dependencies (CD). An example of a conceptual dependency for the example piece of text in FIG. 2B is shown in FIG. 2C.

The one or more syntactical dependencies 154 along with a semio ontology 157 may be used to generate one or more conceptual dependencies 156 that are described below in more detail. The semio ontology 157 may have a set of concepts and categories in a subject area or domain that shows their properties and the relations between them. A transaction is a pattern of communication between the Protagonists 162 of the story. The transaction model was invented by Schank (1975) to support the "Conceptual Dependencies" 156 found behind the constituents of sentences. Schank's original model has been refocused on the news genre, expanded, and complemented by a square model of affects: Assertive, Adverse, Passive, and Supportive as shown in the example below.

| Trans | Assertive | Adverse |
|---|---|---|
| atrans | "give" | "hoard" |
| btrans | "agree" | "disagree" |
| ttrans | "trust" | "betray" |
| mtrans | "inform" | "conceal" |
| etrans | "like" | "dislike" |
| strans | "befriend" | "ostracize" |
| xtrans | "appease" | "confront" |

Each transaction may include a narrative closures (NC) in which a transaction, besides being resolved by a Protagonist according to their affect, is also paired with an expected closure. These closures fulfill the contract: reciprocity of gifts, compliance with the ordinance, retaliation on the attack, etc.

| | | |
|---|---|---|
| give | -> | receive |
| agree | -> | comply |

The piece of text/story may also have narrative functions (NF) in which each function may be paired in a closure, or used by the Protagonist to resolve the transaction, is a Narrative Function. NF are paired in narrative closures (NC). FIG. 2D illustrates an example of the conceptual dependency generated by the indexing method that may be analyzed and extracted using the commercially available Spacy software and algorithm. Each Conceptual Dependency is the core of one Event and the method enriches the syntactic dependency by referring to the semio definition of the transactions as shown in FIG. 2D.

An event 158 is a frame detailing one Narrative Function and the logical connector that links the Event to the other Events in a Causal Chain (CC) 160: subordinate clause, relative clause, or prepositional. The Causal Chain (CC) 160 involves consecution and consequences. For example, after entering a plea deal, Mayor Trevor Elkins "agreed." That clause, centered on the agreement contract, which entails a "Compliance" obligation, has a complemental clause, the agreement's content, which states that Mayor Trevor Elkins has to "step down." FIGS. 2E1 and 2E2 show an example of agree event generated from the text in FIG. 2B. The complemental clause is the consequence of the agreement and the obligation of compliance attached to it. The agreement is itself a consequence of the plea deal. The plea deal entails a string of consequences. The Causal Chain of the three events (including the plea deal) is as follows:

CC=[
    It happened that: MayorTrevorElkinsEnterPleaDeal
    As a result: MayorTrevorElkinsAgree
    As a result: MayorTrevorElkinsStep_Down']

Figure 2F:
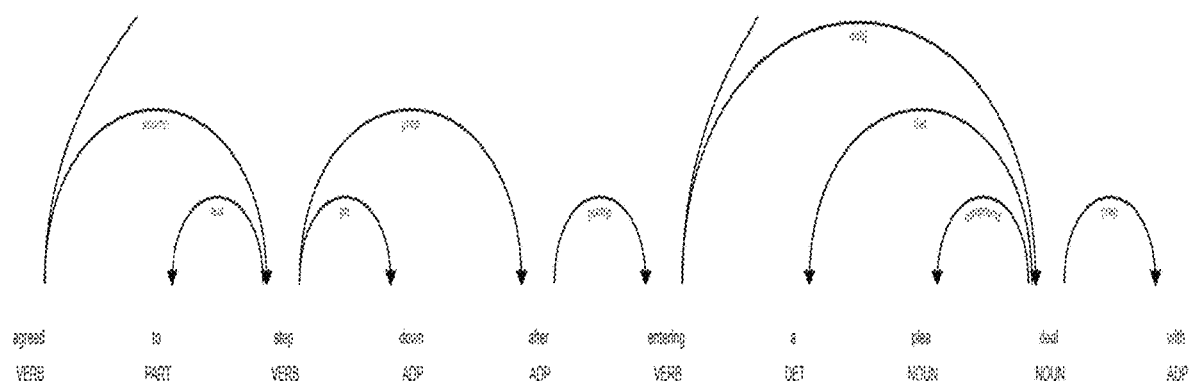
FIG. 2F shows a resulting causal chain for the event shown in FIGS. 2E1 and 2E2.

The dissociation of Events clarifies the scope of the obligations: An agreement has an obligation of compliance. Stepping down has an obligation of cessation of authority. The resulting causal chain is shown in FIG. 2F where this CC follows the consecution order of the sentences in the surface text. From the sentence flow's perspective, the first cause is the last clause, introduced as a prepositional clause by "after." When the Causal Chain is assembled, prepositional clauses are re-ordered in the CC timeline according to their relative time value: "before," "after," "during," etc.

The action has a set of verbal features (tense, affect, mode, etc.) and is mapped to a semio transaction (btrans) and an NF (ACCEPT). The NF entails the obligation to COMPLY. A causal Chain (CC) 160 may be a chain of events. Schank and Abelson developed a "script" model (1977) to describe the sequence of Conceptual Dependencies 156 behind a story. Their definition of a script is a linear sequence of Conceptual Dependencies 156 that accomplishes something from a Protagonist's perspective: their classical "restaurant" script is a perfect example of sequence: take a seat, pick a meal from the menu, eat, pay, and leave. These actions are mere "doings," not dramatic Events staging a Narrative Function. If the customer were to complain about the food or be drunk and start a fight, a Narrative Function is present that calls for closure: confront and retaliate, reprimand and punish.

The Causal Chain 160 of Events is a sequence of Events linked to one another by various causative links. The default assumption is that the Events are linked by narrative consecution and not by consequence (to comply with the tenet of scholastic fallacies: "post hoc ergo propter hoc"). The links may include: Then: Consecution (default); As a result: consequence; And: Synchronous Events; It happened that: Disruptive Event; and As a matter of fact: Side comment. The timeline of the Causal Chain 160 is the text sequence. For instance, in the example of the Event above, the Event has a link to a clausal complement inside the Causal Chain (CC) 160:

'xcomp: MayorTrevorElkinsStep_Down'

This logical link becomes "As a result: MayorTrevorElkinsStep_Down" to link the two Events in the Causal Chain.

It happened that: MayorTrevorElkinsAgree
    As a result: MayorTrevorElkinsStep_Down The story may include a cast on stage (COS) that pervades all Events of the Causal Chain and provides the backbone of the Causal Chain. The COS complements the CC and recaps the Protagonists of the Episode. An Episode comprises a Causal Chain of Events (CC) and a Cast on Stage (COS). For example:

```
episode = {
  "COS": [
    Protagonist
  ]
  "CC": [
    Event
  ]
}
```

An Episode is a narrative unit, likely to be combined with other episodes in a series. The "episodic memory" stores a vivid memory of the Events and their context of affects, Protagonists, and material circumstances. Other similar episodic memories might be spread over a longer period to build the full story. When we recall the episode, we want to binge sequentially throughout the story or jump to different timeline points. That is where the higher level of the Plot will come into play to help us follow the story's unfolding. These episodes may be stored in an episode index 164.

A Plot is a sequence of the main episodes in a story. In particular, episodes can be combined in a Plot to incorporate additional turns of Events, long-term foreshadowed obligations, etc., that stem from the contracts between the Protagonists: compliance or violation of the agreement, forgiveness or payback of villainy, etc. These entailed mechanisms induce a sense of threat and inescapable fate. That is what the "Plot" encompasses, vs. a simple script. Unlike a script which is an unremarkable sequence of Events, the Plot is a stereotyped sequence of Episodes. Let's consider our "Mayor Trevor Elkins" example.

"The charges stem from an Ohio Elections Commission investigation in April of 2021 when the board voted to refer Elkins' conduct for prosecution based on allegations that he used more than $134,000 in campaign funds for personal expenses."

Trevor Elkins is investigated and accused of fraud; they plead not guilty, agree to a plea deal, and finally step down from office. This is the Plot, and it is a staple of official corruption:

Newburgh Heights mayor to step down as mayor, enter plea deal 18.22425079345703 BREAKING: Stonecrest mayor to resign amid federal fraud case 10.710132598876953 JUST LOVELY: Anti-Gun Rochester, NY Mayor Caught With Illegal Guns, Resigns in Plea Deal Involving Both Guns and Campaign Finance Violations 10.678814888000488

Blackwell mayor agrees to plea deal | Ponca City News 8.52720832824707

Thus, a "Plot" has an identity recognized as a trope that can be predicted and reproduced. The Plot is a stereotyped, locked-down sequence along the lines of a larger narrative arc: redemption, rags to riches, fall from grace, or Dark forces at work. A sequence of Episodes becomes a "Plot" when the chain of Events means more than the consecution of Events. For example, the candidate loses the election and retreats from the political scene. These are the Events, and the sequence is a Causal Chain: one loses, and one retreats. As soon as the meaning of these Events are elevated to a chain of Episodes, a Plot is being built: e.g., if the retreat becomes a "desert crossing" experience, as a metaphor for a meditating experience of one's errors, now the episode can foreshadow a possible "triumphal return" development, and maybe a "100 days" or "one too many" short-lived victory.

The result is a long-term, cinemascope size Plot with unexpected turns of Events, alliances and betrayals, cliffhanger decisions, and strong morals. The plot may be seen as a tree of resolutions since the plot combines Episodes predictably: depending on their persona, the Protagonists will likely resolve the Episodes in assertive, supportive, adverse, or passive ways. The fully expanded Plot is the tree of all these possible resolutions of the Episodes, depending on the semiotic square of personae. This tree has moving parts, from one version to another, but as a whole, maintains the trope's integrity.

Each Protagonist 162 may have an arc and from Episode to Episode, the Protagonists predictably follow their own arc. Like the Narrative Functions, the Protagonists can be defined at a generic level (e.g., Villain, Hero, Victim, Witness) or at an Episode level (e.g., Corrupt officials, Lawyer, Prosecutor). The Protagonists 162 keep inside the Plot their archetypal meaning (e.g., Whistleblower, Messiah, Judas). Because the Protagonists are traced from one Episode to the next, they provide the Plot with its rigging (see Jurafsky). The Protagonist list recaps the subject, object (if animate), and recipient of the Events and their type in WordNet or DBpedia. An example may be, for the Mayor Elkins example:

{'name': 'Mayor Trevor Elkins',
'isa': 'official',}

Thus, the plots discussed below may be generated using the indexing method in FIG. 2 in shown in FIG. 12. The use of the plots in the discovery loop is discussed below in more detail.

Figure 3A:
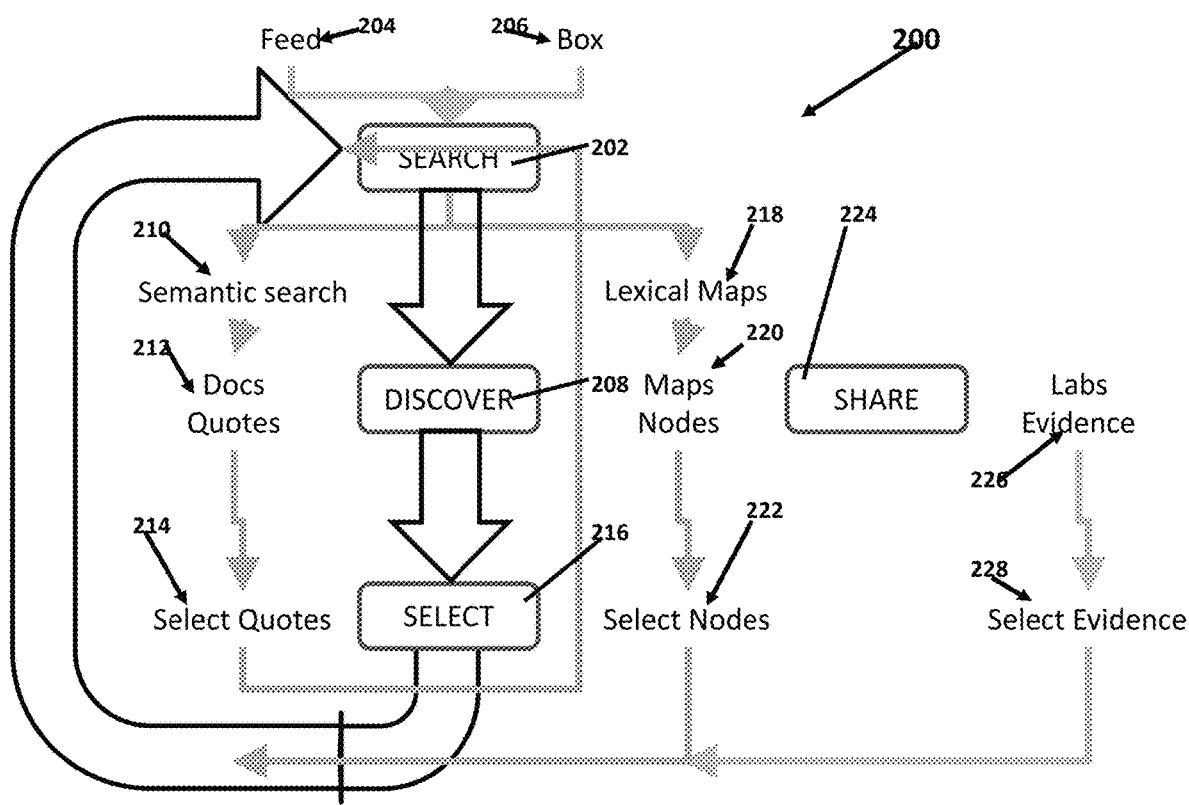
FIG. 3A illustrates a method for discovery looping that may be performed by the system in FIG. 1.

FIG. 3A illustrates a method for discovery looping 200 that may be performed by the system in FIG. 1 or by other computer systems. Details of the processes of the method are described below with reference to FIGS. 3-9. A user may conduct a search process 202 based on a feed 204, such as a new feed, or a search box 206 in which the user enters a set of query terms in a well-known manner. The search process returns search results based on a search process as is well known. The results of the search 202 may be fed into a discovery process 208. The search, discovery and select processes together form the discovery loop process. During the discovery process 208, a semantic search 210 may be performed in which documents or quotes 212 may be returned to the user that allows the user to explore the search results and discovery themes and stories wherein then returned docs and quotes look like the typical search results being returned to the user. The user may then select quotes 214 during a selection process 216 that is part of the discovery loop and the selected quotes are fed back to the search process 202 forming the discovery loop. During the discovery process 208, a lexical map process 218 may be performed in which maps and nodes 220 are generated and the user can select nodes 222 from the lexical maps. The selected nodes 222 may be may also be fed back to the search process 202 and form part of the discovery loop. The method 200 may further include a sharing process 224 in which Labs and evidence 226 may be generated and the user may select evidence 228. An example of the labs evidence is shown in FIG. 3B. The selected evidence 228 may be fed back to the search process 202. Each of the selected evidence 228, the selected nodes 222 and/or the selected quotes 214 are used to perform an updated search based on the selected evidence 228, the selected nodes 222 and/or the selected quotes 214 wherein the user is not aware of this exploration/discovery is being performed mostly in the background.

For example, a lexical search processes a query as a string of characters and uses string manipulations (e.g. stemming, regular expressions, etc.) to restrict or extend the scope of the possible matches of the string vs. the lexical index. The lexical search then uses weighting algorithms (e.g. TF-IDF) to balance the frequency of the matches in one document vs. the frequency across documents. A semantic search encodes the query as a vector of "embeddings", i.e. a vector representation of all the contexts where the word has been found. It uses distance metrics (e.g. cosine similarity) to rank the nearest neighbors of the query in the space of encoded documents. A semiotic search interprets the query as a pattern of communication: a cluster of nodes or a causal chain of events and matches the pattern against similar known patterns, and uses weighting algorithms (e.g. the ontology depth of the match) to rank the closest maps or plots.

The discovery loop uses all these above described mechanisms in the background, depending of the discovery intent: "zoom in" (get a more detailed view), or "zoom out" (get a larger perspective). For zoom in, the discovery loop extracts, from selected document(s), query results or "quotes" (occurrences of nodes or events). A smaller selection of documents provides a detailed view of the connections between named entities and concepts, the groupings of nodes into communities of interest, and the critical role of "in-between" nodes. In the discovery loop zoom in, from selected node(s) in the map, it builds/generates a map focused on specific nodes from the nodes "quotes" with lower thresholds of frequency, co-occurrence, and mutual information, as well as an adjusted scope of co-occurrence: sentence, multiple sentences or paragraph. This map reveals more of the local intricacies of the selected nodes. For selected event(s) in the plot, the discovery loop may generate a plot or a map focused on a specific event that reveals the circumstances of the event, and details the peripheral protagonists involved (e.g. witnesses, side-kicks, etc.).

For the zoom out, the discovery loop extracts, from selected document(s), query results or "quotes" (occurrences of nodes or events) and a larger selection of documents provides a larger map, given that the number of nodes in the map is limited by a usability threshold, depending on the size of the display (mobile vs. PC). The thresholds of frequency, co-occurrence, and mutual information will favor the major topics and named entities across documents. In the zoom out, from selected node(s) in the map, a map focused on specific nodes is built from the nodes "quotes" with higher thresholds of frequency, co-occurrence, and mutual information, as well as an extended scope of co-occurrence in the neighboring paragraphs. This map reveals less of the local intricacies of the selected nodes and more general patterns. In the zoom out, from selected event(s) in the plot, a map focused on a string of specific events reveals sub-plots of minor events, given that the number of nodes in the map is limited by a usability threshold, depending on the size of the display (mobile vs. PC).

Figure 4:
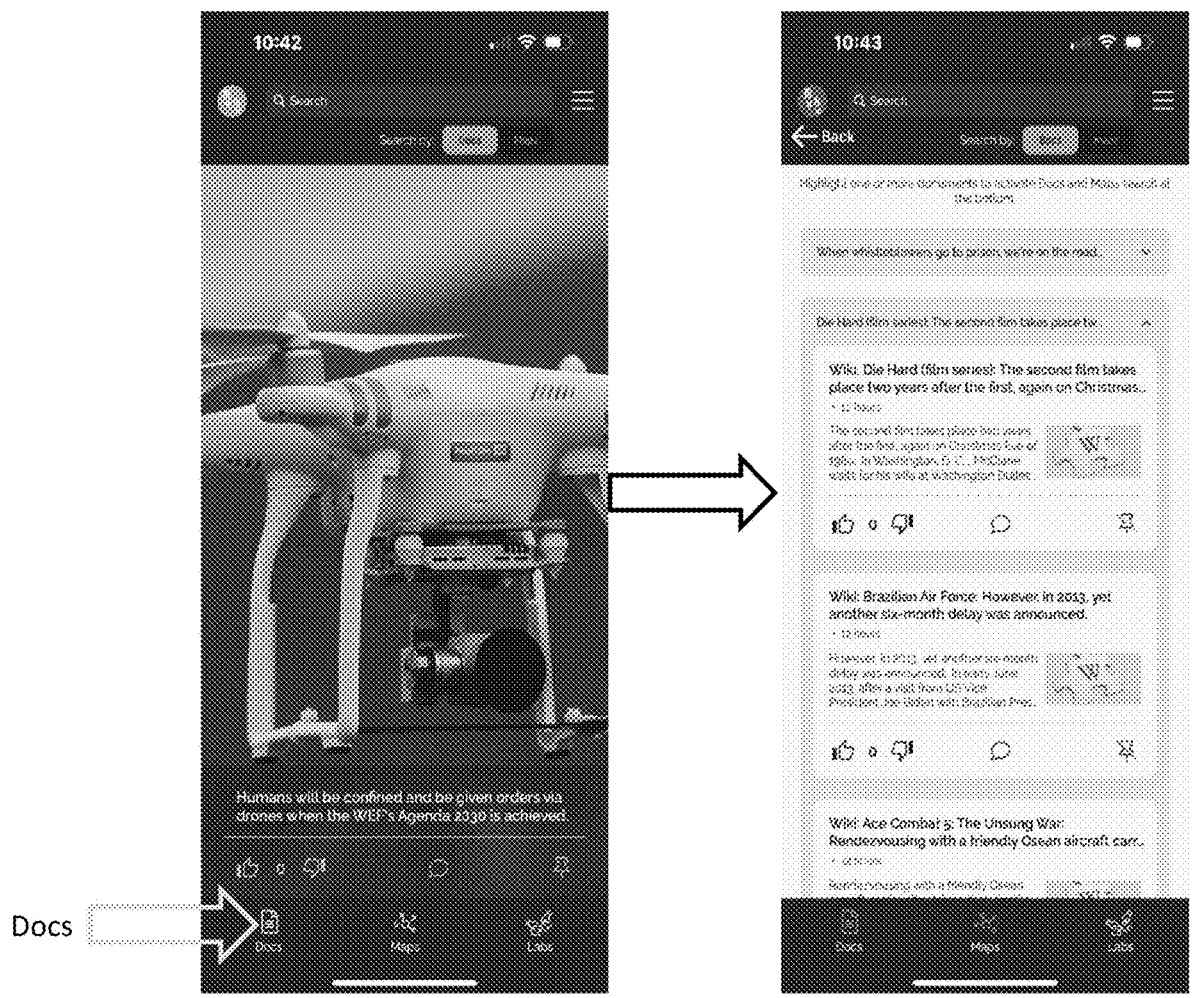
FIG. 4 illustrates an example of a discovery process from a feed to documents that is part of the discovery loop.

FIG. 4 illustrates an example of a discovery process from a feed to documents that is part of the discovery loop. As shown in FIG. 3A, the user has browsed or scrolled (using a mobile app in this example) to a news feed about humans being confined and given orders via drone and selects a "docs" button/menu item and the backend system returns the one or more documents that are relevant to the new feed showing the semantic search process 210 and the returned docs/quotes 212.

Figure 5:
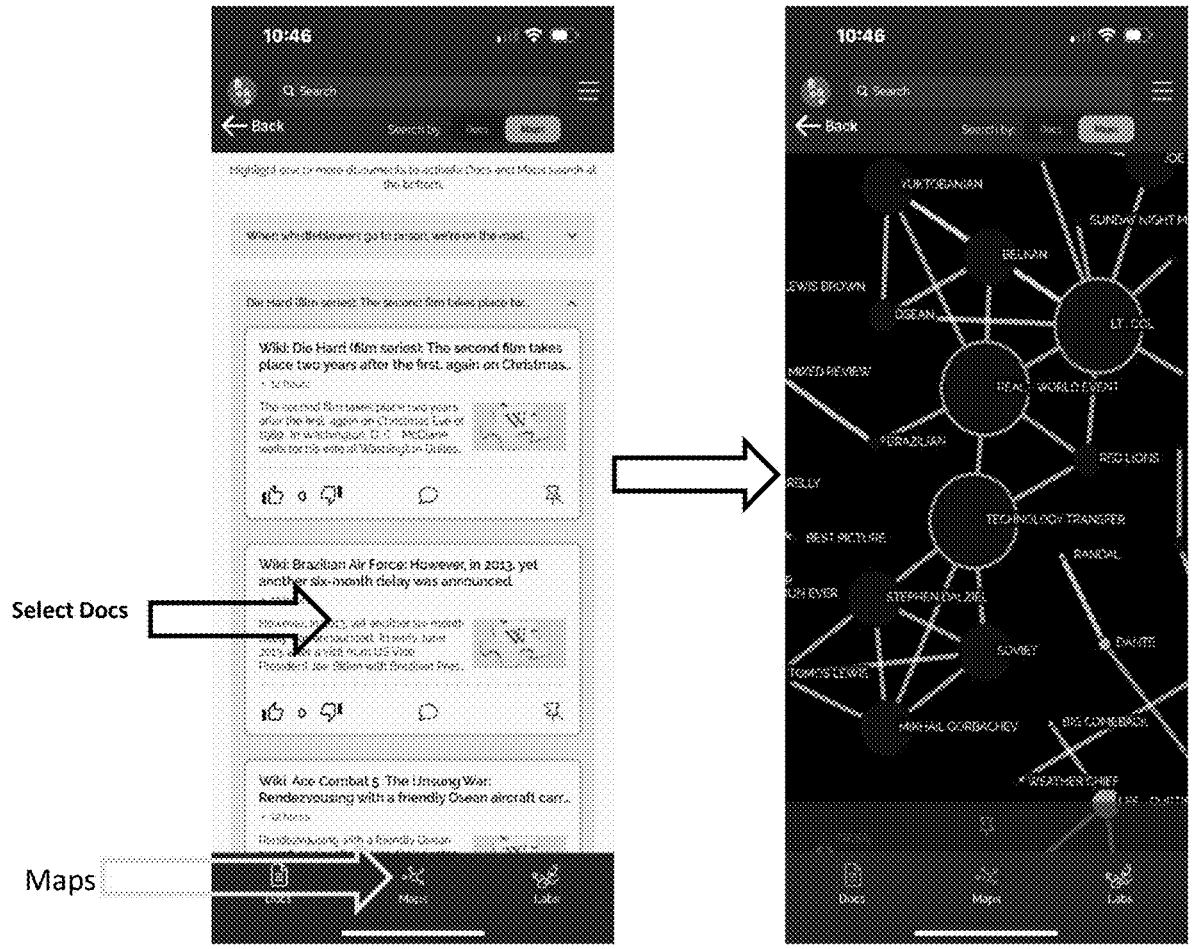
FIG. 5 illustrates an example of a discovery process from a documents to maps that is part of the discovery loop.
Figure 6:
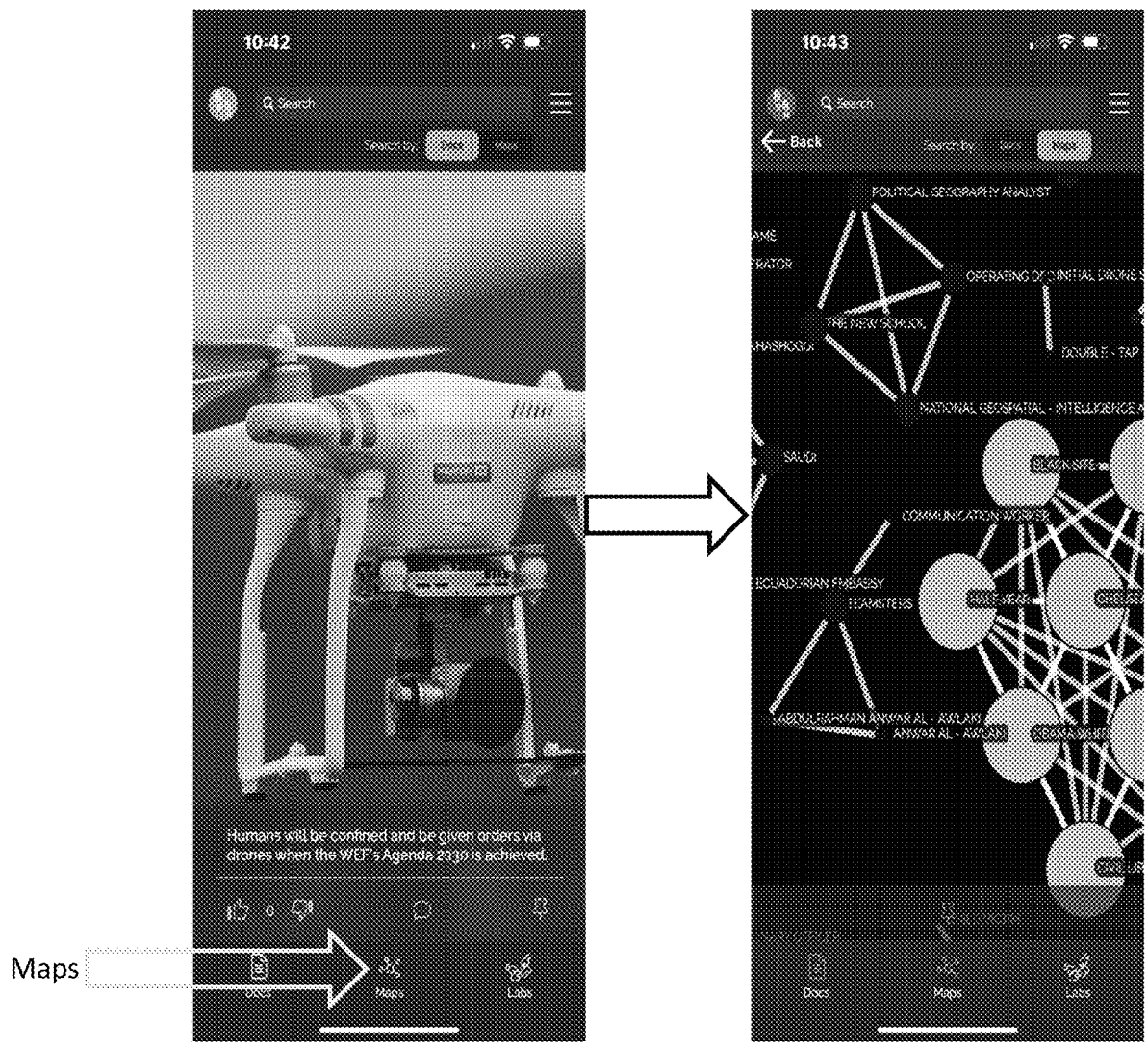
FIG. 6 illustrates an example of a discovery process from a feed to map that is part of the discovery loop.

FIG. 5 illustrates an example of a discovery process from a documents to maps that is part of the discovery loop. As shown in FIG. 5, a user can browse the documents returned to the user in a user interface and select a document 214 such as the Brazilian Air Force document in this example. The user may then select the "Maps" button/menu item displayed in the user interface and the backend generates and returns a lexical map with nodes to the user as shown in FIG. 5. FIG. 5 shows the feedback of the selected documents 214 to the search process 202 whose results are fed to the maps discovery processes 218, 220 to generate the lexical map that is displayed to the user.

Figure 7:
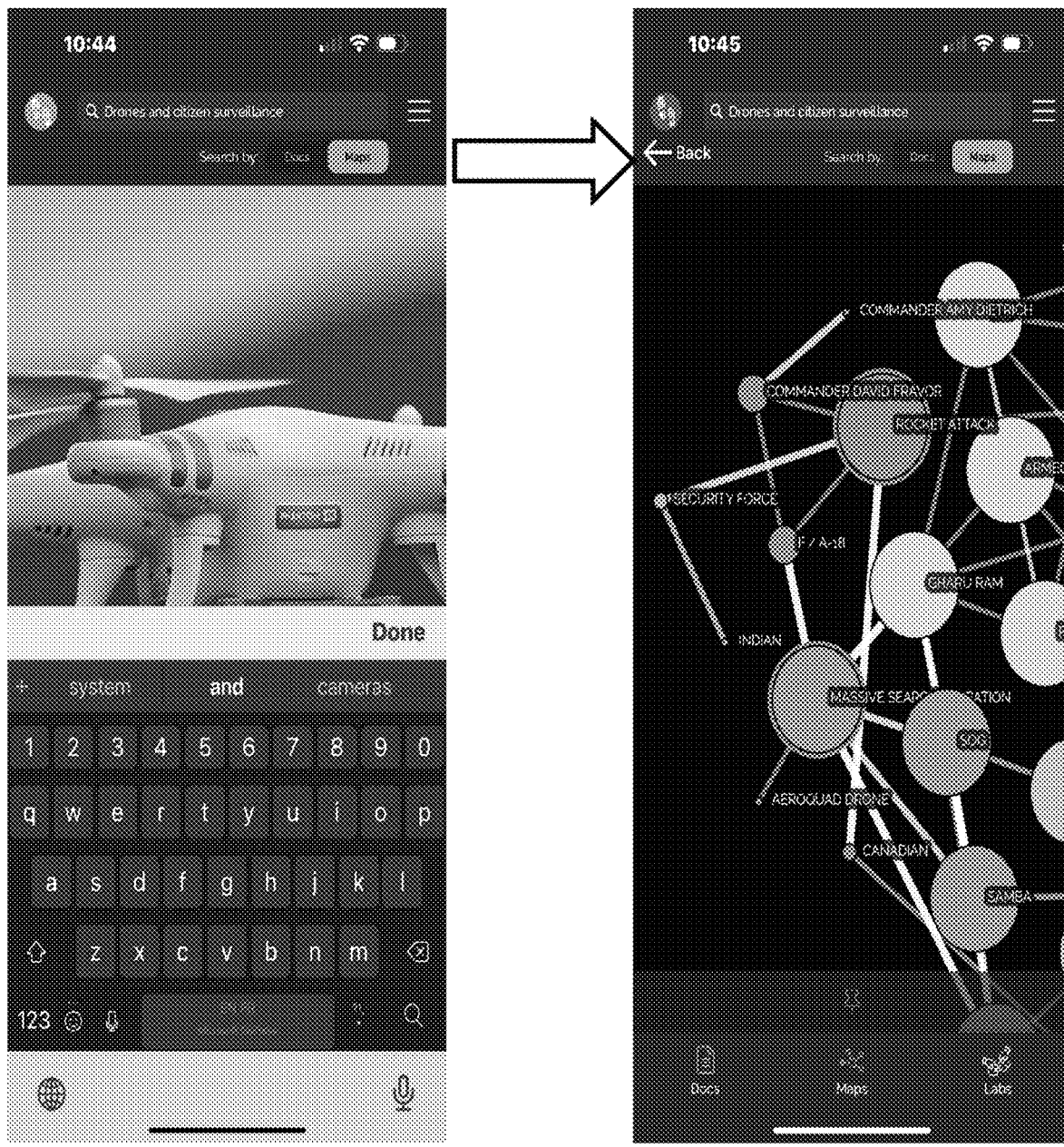
FIG. 7 illustrates an example of a discovery process from a box to maps that is part of the discovery loop.

FIG. 5 illustrates an example of a discovery process from a feed to map that is part of the discovery loop in which the user has browsed/scrolled to the same news feed as in FIG. 4 and has instead selected a maps button/menu item in the user interface (lexical maps process 218 based on the feed 204). The backend may generate the maps/nodes based on the selected feed and return the maps and nodes 220 to the user in the app user interface. This shows how the original selected feed by the user can be used as input to the maps process 218. FIG. 7 illustrates an example of a discovery process from a box to maps that is part of the discovery loop in which the user has entered search terms ("Drones and citizen surveillance" in this example) in the search box process 206. The user may then select the maps user interface menu item. The backend may generate a lexical map based on the search query terms and return the generated lexical map to the user as shown in FIG. 7. This shows how the original search query box terms 204 entered into the user interface by the user can be used as input to the maps process 218.

Figure 8:
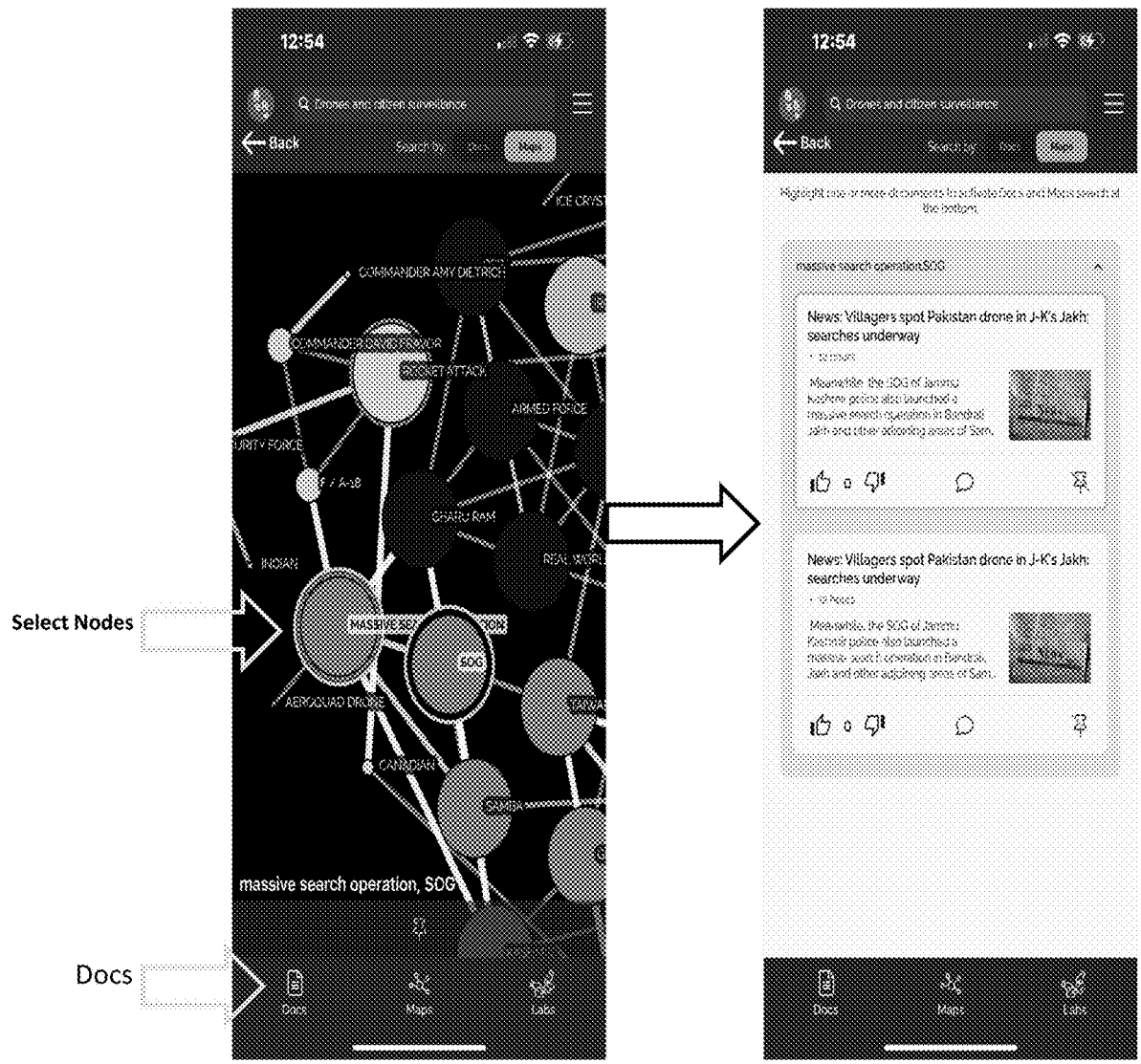
FIG. 8 illustrates an example of a discovery process from maps to documents that is part of the discovery loop.

FIG. 8 illustrates an example of a discovery process from maps to documents that is part of the discovery loop in which nodes are selected 222 and fed back into the search process 202 to generate documents 212. In this example, documents (docs) may be quotes of the co-occurrence of nodes in the map selected by the user. Using the user interface, the user may select one or more nodes and then select the Docs menu item/button in the user interface. The backend may perform an updated search 202 based on the selected nodes 222 and return the documents found to the user as shown in FIG. 8. FIG. 8 shows the selected nodes 222 during the discovery process 208 being fed back into the search process 202 seamlessly.

Figure 9:
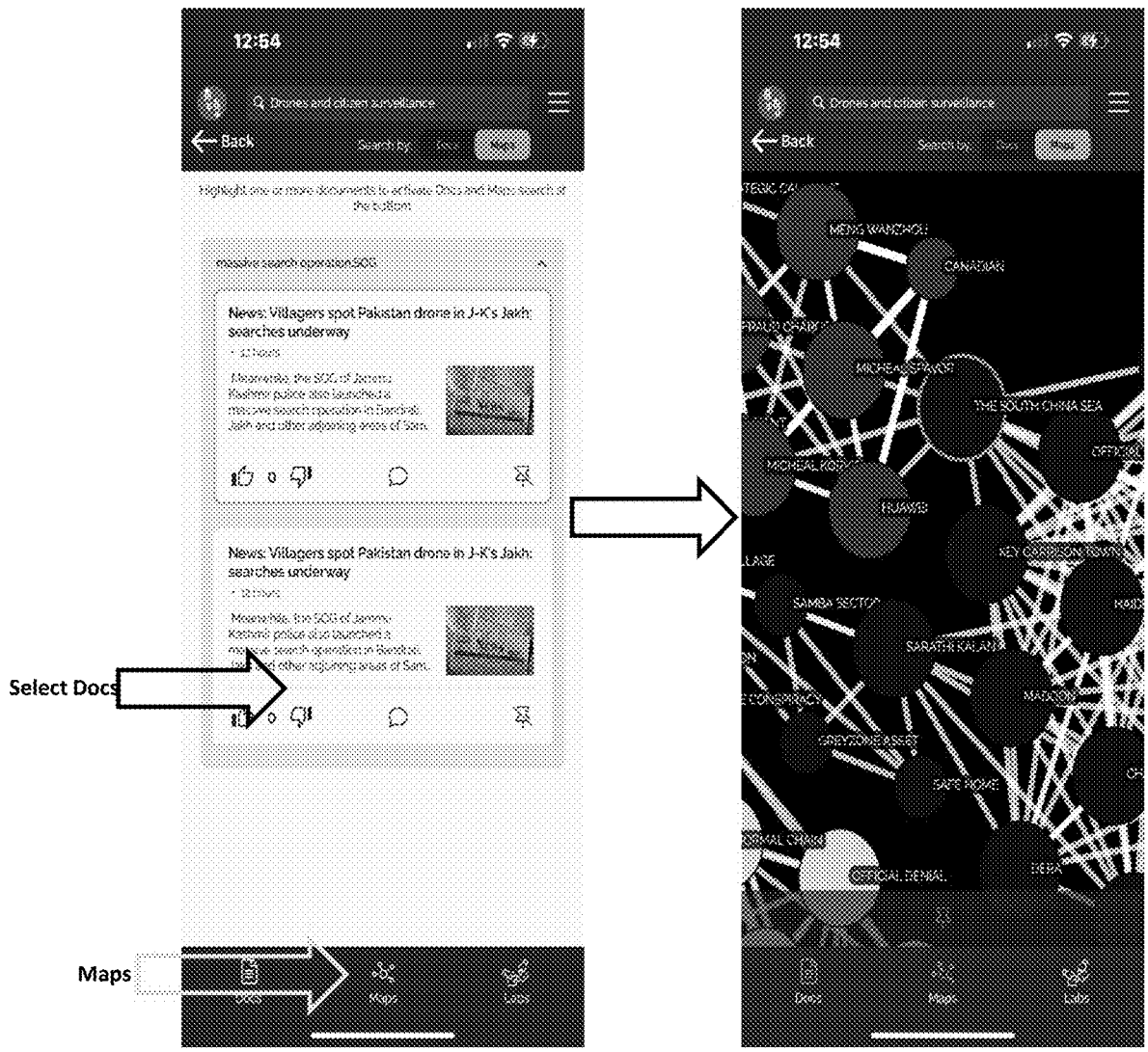
FIG. 9 illustrates an example of a discovery process from a loop documents to maps that is part of the discovery loop.

FIG. 9 illustrates an example of a discovery process from a loop documents to maps that is part of the discovery loop in which docs/quotes 212 identified during the discovery process 208 (known as loop docs) and fed back to the search process 202 and used to generate a lexical map by the lexical map process 218. As shown, the user may select docs/quotes 214 during the discovery process 208 that are fed back to the search process 202. The user may then selects the "maps" menu item/button and the backend generates a map and nodes 220 as part of the lexical map process 218.

Figure 10:
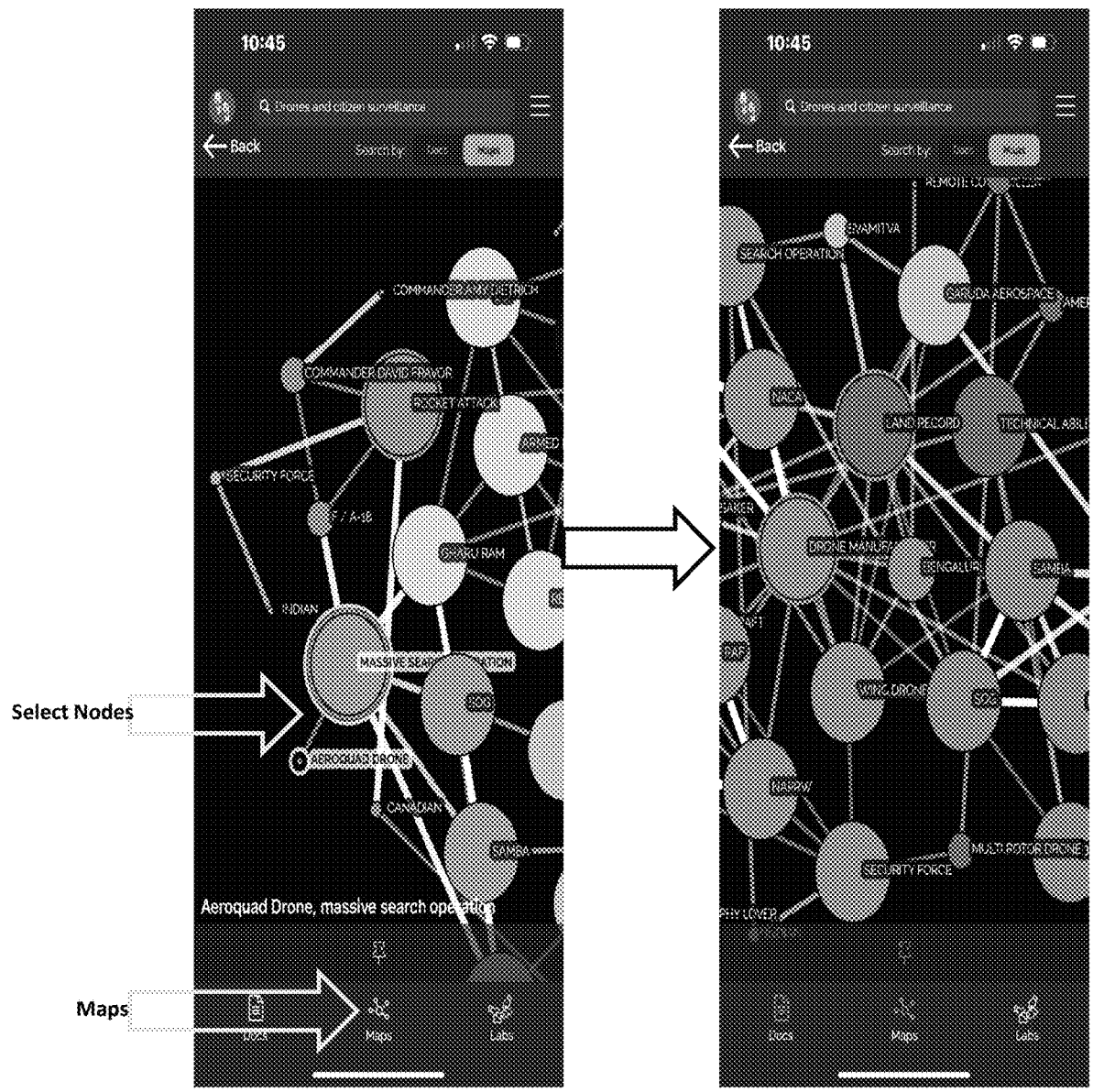
FIG. 10 illustrates an example of a discovery process from a loop map to map that is part of the discovery loop.

FIG. 10 illustrates an example of a discovery process from a loop map to map that is part of the discovery loop in which maps/nodes 220 identified during the discovery process 208 (known as loop docs) and selected 222 and fed back to the search process 202 and used to generate an updated lexical map by the lexical map process 218. As shown, the user may select a node or nodes (such as massive search in this example) 22 during the discovery process 208 that are fed back to the search process 202. The user may then selects the "maps" menu item/button and the backend generates a map and nodes 220 as part of the lexical map process 218 that is based on the selected node/nodes of the user, again seamlessly.

The examples in FIGS. 3-9 illustrate that the user can seamlessly perform searching or mapping from a single user interface and can perform discovery loop activities unbeknownst to the user. Thus, from the user's perspective, the exploration is seamless and from the discovery engine perspective, selected excerpts from documents or selected nodes from map are first transformed into sets of search results, and then displayed as expected by the user: as documents or as a new map. The discovery loop process being performed provides the user with a visual rendition of the semiotic patterns found in the documents: consistent connections between named entities and concepts. In addition to the discovery loop embodiment shown in FIGS. 3-9, the discovery loop may also utilize one or more plots in which a plot is a causal chain of situations and each situation is aggregates of conceptual dependencies as discussed below in more detail. These plots which are generated by the system may be integrated into the same discovery loop system and method shown in FIGS. 1-2. When the plots are part of the discovery loop system, the discovery loop engine 106B in FIG. 1 may further include a plot engine 106D that generates the plots and integrates the plots into the discovery loop system and method.

There is an order of magnitude between map and plot. The map is a distilled view, that eliminates the contingent, and keeps the essential. It is still very close to the document surface, and does not go further than the recurrence of associations. It is a spectacular source of insights because our brains interprets the connections, and uses the map to build a global representation of the underlying forces at play: key influencers, disruptive entities, relative strength of communities of interest, etc. The plot is an interpretation of the narrative at play behind the events. The events are connected into causative chains, and arranged into main plot lines and sub-plots. The sequencing of the narrative, and the entailment of obligations for the protagonists, supported by the ontology of narrative tropes, allows the semiotic engine to predict the next likely turn of events, or explain the current chain of events, from each protagonist's perspective. Another way to consider the difference between the map and plot is that a map is a static, unbiased view while a plot is an interpretation of the narrative and different tropes will produce different narratives.

Figure 11:
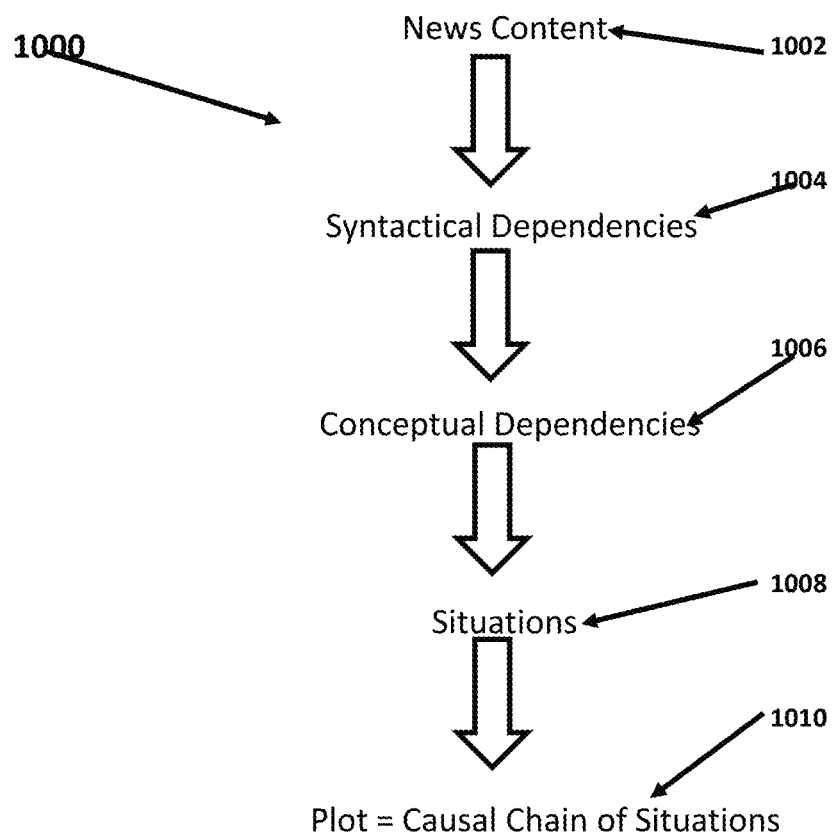
FIG. 11 illustrates a method for generating a plot.

FIG. 11 illustrates a method 1000 for generating a plot. A piece or pieces of news content 1002 may be used to generate one or more syntactical dependencies 1004 (shown in more detail in FIG. 12 and described below). The one or more syntactical dependencies 1004 may be used to generate one or more conceptual dependencies 1006 (shown in more detail in FIG. 13 and described below). The one or more conceptual dependencies 1006 may be used to generate one or more situations 1008 (shown in more detail in FIG. 14 and described below) and then the one or more situations 1008 may be used to generate one or more plots 1010 wherein each plot is a causal chain of situations.

Figure 12:
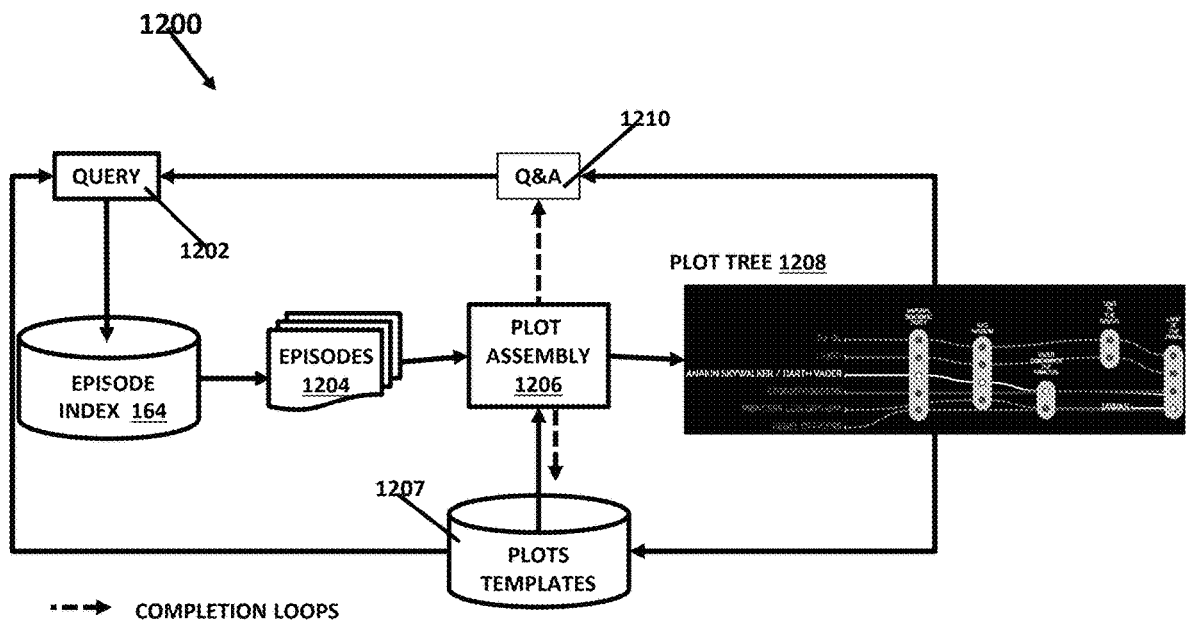
FIG. 12 illustrates a plot completion process.
Figure 14:
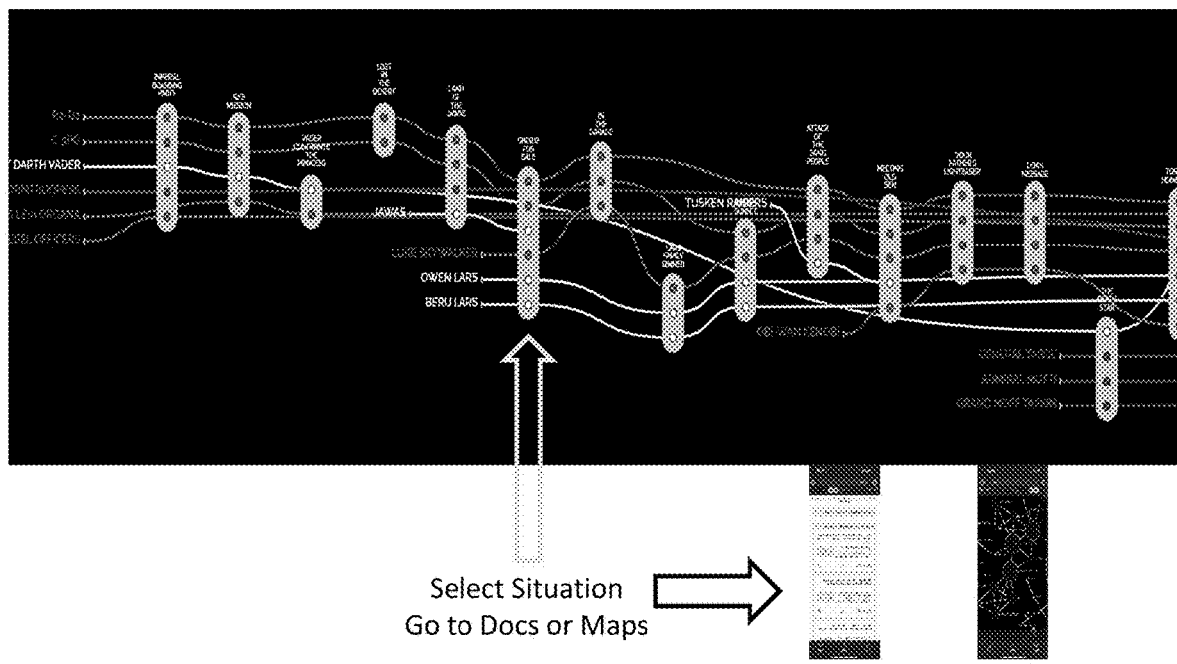
FIG. 14 illustrates the use of plots in the discovery loop.

FIG. 12 illustrates a plot completion process 1200 by which the plots are generated based on the episode index 164. The plot completion process 1200 in FIG. 12 may be performed by the discovery loop engine 106B but may also be performed using other computer systems or even a computer system that is separate from the system in FIG. 1 or a third party system. In one embodiment, the plot completion process may be implemented by a processor of the computer system executing a plurality of instructions that cause the processor to perform the operations/processes of the plot completion process. In the process, the user may submit a query 1202 that is parsed and used to search the episode index 164 for one or more episodes 1204 retrieved based on the query. The one or more episodes 1204 may be fed into a plot assembly process 1206 that also receives input from a plot template store 1207. The plot assembly process 1206 may generate a plot tree 1208 (a larger example of which is shown in FIG. 14 and discussed below). Feedback from the user to each generated plot tree 1208 may be fed back to the plot template store 1207. The plot templates 1207 may also provide input to the parsing of the query 1202. The feedback from the user about the plot tree 1208 may be fed into a Q&A process 1210. The output of the Q&A process 1210 may also be used to improve the query process 1202.

The Q&A process 1210 may be implemented as "spider" software that uses Q&A templates to close the open Narrative Closures (NC) and incrementally complete the Episodes. Examples of this process as described below when discussing the missing episode. The questioning loop generates closed queries that try to match complementary events, in a "spider" logic. The process generate queries from 13 questioning templates as discussed below and shown in FIG. 24.

Figure 13:
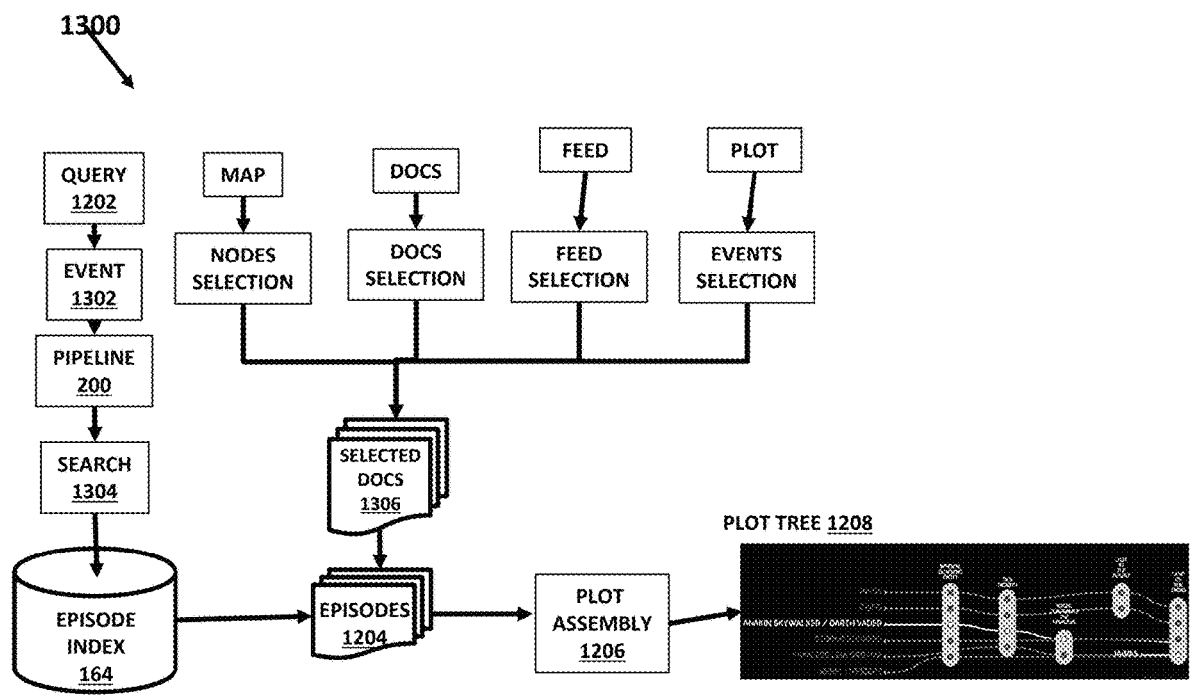
FIG. 13 illustrates the discovery loop with plots.

FIG. 13 illustrates the discovery loop with plots 1300. The discovery loop with plots process 1300 in FIG. 13 may be performed by the discovery loop engine 106B but may also be performed using other computer systems or even a computer system that is separate from the system in FIG. 1 or a third party system. In one embodiment, the plot completion process may be implemented by a processor of the computer system executing a plurality of instructions that cause the processor to perform the operations/processes of the discovery loop with plots process. After a user query 1202, the query is parsed to generate/determine an event 1302 that is fed into the pipeline process 200 shown above in FIG. 3A. The pipeline process 200 may then perform the search process 1304 of the episode index 164 to generate the one or more episodes 1204. Then, as described above in FIG. 3A, one or more nodes are selected from a map, one or more docs are selected from a corpus of documents, one or more feeds are selected from a feed corpus and one or more events are selected from generated plots and plot templates to generate one or more selected docs 1306. The one or more selected docs 1306 are combined with the episodes 1204 and input to the plot assembly process 1206 that generates the plot tree 1208 that is displayed in a user interface to the user.

FIG. 14 illustrates the use of plots in the discovery loop. FIG. 14 illustrates a user interface of the discovery loop app user interface in which generated plots (from the content) are displayed in the user interface. In the example in FIG. 14, a corpus of Star Wars content was used to generate one or more plots such as "droids for sale", "lost in the desert", "imperial boarding party" and "the Death Star" as shown in FIG. 14. Using the user interface, a user can select or plot/situation ("Droids for Sale" in this example), feed the selected plot/situation (using the discovery process) back to the search process in which the user can select to see docs or maps (examples of both are shown in FIG. 14) based on the updated search using the selected plot/situation. For example, the user may do an initial semantic search for Star Wars, and see the user interface in FIG. 14 in which the user selects the particular plot-situation.

Example of Search for Plots from Query

An example is given below that illustrates the search for plots based on an initial query. The user's query (such as for example ""Trevor Elkins accused of frauds." ") is analyzed as an Event using the dependency parser described above. FIGS. 15A and 15B illustrates the conceptual dependencies for the Mayor Elkins example query while FIG. 16 illustrates the episode generated for the example and FIG. 17 illustrates an example of the search pipeline generated from the episode in FIG. 16.

Using the search pipeline, the system may perform an aggregation search in a semiotic index that returns episode titles and scores as shown in FIG. 18. The system may then perform episodes synchronization. The first episode in FIG. 18 may be as shown in FIG. 19. This "not guilty" plea could be a variant of the same story. If a search for similar sequences of Episodes is performed, the system finds many cases where the initial plea of the official was "not guilty" as shown in FIG. 20.

The plot templates 1207 discussed above may include a "corrupt official resigns" trope, an example of which is shown in FIG. 21. The logic behind the trope sounds reasonable: anybody getting close to sentencing might want to change their plea and accept a plea deal with the Court. Our template is the gist of the four results/Episodes returned by the pipeline once we re-order them as shown in FIG. 22. The Plot template provides the default generic timeline and helps us to sequence the Episodes in the Plot. The system may then handle Synchronized Events, Expected event missing from the Episodes returned by the pipeline (as generated from the terms of the query) (In our example, the system misses the whistleblower exposing the official's scheme); and an Actual Event missing from the Plot template that will create a secondary bypath in the Plot display (an example of which is shown in FIG. 14). Plots are "trees", that follow the sequence of the most generic templates and add the specifics of the various versions found.

The system may then look for missing episodes. In this example, the question is: was there a whistleblower Event in the Trevor Elkins story? The system proactively uses a pipeline focused on "Trevor Elkins" and an array of lexical variations around the "EXPOSE" Narrative Function: ["accusation," "investigation," "allegation"] as shown in FIG. 23. The first result (""3News Investigates: Newburgh Heights Mayor Trevor Elkins charged with attempted fraud"), provides the missing event ("The charges stem from an Ohio Elections Commission investigation in April of 2021 when the board voted to refer Elkins' conduct for prosecution based on allegations that he used more than $134,000 in campaign funds for personal expenses.") Once the system has the starting point of the Plot, the system allows the user to go back and forth between possible templates and actual Episodes to branch the versions, synchronize similar Events and Episodes, and look proactively for missing Events.

The system may also exhaust the possible questions and ensure that the system has an answer. In the system, questions revolve around the core template, which is: Now [PROTAGONIST] must [GOAL] despite [CONFLICT] or else [CONSEQUENCE]. The system may generate query templates. This generates the queries templates (after Wendy Lehnert, "The process of Question Answering" is shown in FIG. 24.

The Plot structure across Episodes may be Protagonists. The Protagonists are the wiring structure of the story, with their own persona and arc development. Starting with a pair, they are the first and foremost clue that two Episodes can be linked in a Plot.

The Plot structure across Episodes may be Entailment of Obligations. For example, when Trevor Elkins "ACCEPTS" the plea deal agreement, they are bound to "COMPLY." That is the "obligation" attached to most Narrative Functions. The semiotic ontology provides these dependencies and allows us to anticipate the unfolding of the story and to proactively search for Events that resolve the obligation if they can be found. Not finding them does not mean that these Events did not happen. Hence, the system answers to the questions above can be based on story Events or on narrative anticipations.

Throughout the Plot, the obligations attached to Events are flagged as fulfilled or unfulfilled, depending on how the following Events resolve the obligations. For instance, Trevor Elkkins has to COMPLY, and once they STEP_DOWN, the obligation is flagged as fulfilled. The unfulfilled obligations are the most interesting because they transform the Plot into a prediction device. The way an obligation is "resolved" by a protagonist depends on their persona: assertive, adverse, passive, or supportive, according to the semiotic square. Considering how a protagonist is acting in the Plot, we can also predict how the Protagonist will choose to resolve the obligation: in a conciliatory or confrontational way.

As discussed above, the plots may be integrated into the discovery loop. In the system, a query is transformed into an Event, which generates an aggregation pipeline used to search the semiotic index and assemble a Plot from the results. The discovery loop creates many other combinations, which always go back to the matching between Episodes and Plots using the various devices exposed above. Besides the query entered in the search box, Plots can be requested from: Feed, Documents, Maps and other Plots Appendix A (12 pages) provide 2 more examples of the system and its processes and Appendix A forms part of the specification and is incorporated herein by reference.

The disclosed system and method is a discovery loop system and method that seamlessly loops from content to search results displayed as documents or maps, then from selected documents or node(s) in map to documents or maps. The disclosed system and method is also a system that generates plots by aggregating events into situations and a causal chain of situations into plots. The disclosed system and method also embody a model for an Event and the software to extract the event data from titles, summaries, and search queries that has/uses a "Semiotic Index" that defines the format of Episodes, Events, and Protagonists and stores the index used by the search engine and a "semiotic indexer" that produces from the raw text the index of Episodes, Events, and Protagonists used by the search engine. The disclosed system and method also embody a model of an Episode and the software to build the episodes from the Causal Chain and the Protagonists that includes a model of a Causal Chain and the software to chain events, a model of Protagonists and the software to extract them from the events, a model to chain the Events into the Episode and decide on the Causative link and a "spider" software that uses Q&A templates to close the open Narrative Closures (NC) and incrementally complete the Episodes.

The disclosed system and method also embody a model of a Plot and the software to build the Plot branches from episodes that includes a Plot search aggregation pipeline generator that combines Narrative Closures, Obligations, and Episodes to build a Plotline, a model to synchronize Episodes across results and branch variants or complementary Events, a Simplified English generator of Plot synopsis in plain English and an integration of the plots into the discovery loop. The disclosed system and method also embodies a model of an aggregation pipeline and the software to generate the pipeline from the events extracted from search queries. The disclosed system and method also embodies a search aggregation pipeline generator that combines "cast on stage" with Events to search the Semiotic Index for Episodes.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
a computer system having a processor and a memory and a plurality of lines of instruction executed by the processor to cause the processor to be configured to:
receive a search query;
parse a plurality of events from the search query;
perform a search process based on the search query to return a search result that matches the search query that includes a plurality of returned documents;
receive a selection of a returned document of the plurality of returned documents;
perform a discovery process based on the selected returned document to generate a lexical map of the selected returned document, the lexical map having nodes and edges that connect two nodes together wherein each node is a phrase from the selected returned document;
receive a selection of a node in the lexical map that are fed back into the search process to form a discovery loop process that loops from content to the search result which is displayed as one of a document and a map and from a selected one of document and a node in the map to one of second documents and a second map;
perform a second search process based on the selected node in the lexical map;
generate a plot from a plurality of episodes, wherein the plot is a visual rendition of the plurality of events and a plurality of protagonists in the content;
aggregate the plurality of events into one or more situations and aggregate a causal chain of the one or more situations to generate the plot;
generate each episode of the one or more episodes using a model of the episode having a model of the causal chain, a model of each protagonist to extract from an event of the plurality of events, and a model to chain the plurality of events into said each episode and decide on a causative link and a questionnaire to close an open narrative closure (NC) and incrementally complete said each episode; and
display a revised search result from the search query, the selected returned document, and the selected node of the lexical map using the discovery loop process.

2. The system of claim 1, wherein the processor is further configured to generate each event using a model of the event having a semiotic index that defines a format of the episode, the event, and a protagonist and stores the semiotic index used by a search engine and a semiotic indexer that produces, from a raw text of the content, the semiotic index of the each of the episodes, each of the events, and each of the protagonists used by the search engine.

3. The system of claim 1, wherein the processor is further configured to use a model of a plot to said generate the plot having a plot search aggregation pipeline generator that combines a narrative closure, an obligation and said each episode to build a plotline, a model to synchronize the plurality of episodes across results and branch variant events and an English generator of plot synopsis in plain English.

4. The system of claim 1, wherein the processor is further configured to use a model of aggregation pipeline to generate a pipeline from the plurality of events extracted from the search query.

5. The system of claim 2, wherein the processor is further configured to use a search aggregation pipeline generator that combines a cast with the plurality of events to search the semiotic index for episodes.

6. A method, comprising:
receiving, by a computer system having a processor and a memory and a plurality of lines of instruction executed by the processor, a search query;
parsing, by the computer system, a plurality of events from the search query;

performing, by the computer system, a search process based on the search query to return a search result that matches the search query that includes a plurality of returned documents;

receiving, by the computer system, a selection of a returned document of the plurality of returned documents;

performing, by the computer system, a discovery process based on the selected returned document to generate a lexical map of the selected returned document, the lexical map having nodes and edges that connect two nodes together wherein each node is a phrase from the selected returned document;

receiving, by the computer system, a selection of a node in the lexical map that are fed back into the search process to form a discovery loop process that loops from content to the search result which is displayed as one of a document and a map and from a selected one of document and a node in the map to one of second documents and a second map;

performing, by the computer system, a second search process based on the selected node in the lexical map;

generating, by the computer system, a plot from a plurality of episodes, wherein the plot is a visual rendition of the plurality of events and a plurality of protagonists in the content;

aggregating the plurality of events into one or more situations and aggregating a causal chain of the one or more situations;

generating, by the computer system, each episode of the one or more episodes using a model of the episode having a model of the causal chain, a model of each protagonist to extract from an event of the plurality of events, and, a model to chain the plurality of events into said each episode and decide on a causative link and a questionnaire to close an open narrative closure (NC) and incrementally complete said each episode; and displaying, by a display of the computer system, a revised search result from the search query, the selected returned document, and the selected node of the lexical map using the discovery loop process.

7. The method of 6 further comprising generating, by the computer system, each event using a model of the event having a semiotic index that defines a format of the episode, the event, and a protagonist and stores the semiotic index used by a search engine and a semiotic indexer that produces, from a raw text of the content, the semiotic index of the each of the episodes, each of the events, and each of the protagonists used by the search engine.

8. The method of claim 6, wherein the generating the plot further comprises using a model of the plot to generate the plot having a plot search aggregation pipeline generator that combines a narrative closure, an obligation and said each episode to build a plotline, a model to synchronize the plurality of episodes across results and branch variant events and an English generator of plot synopsis in plain English.

9. The method of claim 6 further comprising generating, by the computer system, a pipeline using a model of an aggregation pipeline from the plurality of events extracted from the search query.

10. The method of claim 7 further comprising searching, by the computer system, the semiotic index for episodes using a search aggregation pipeline generator that combines a cast with the plurality of events.

* * * * *